Oct. 22, 1957 B. D. LOUGHLIN 2,810,780

COLOR TELEVISION INTERLACING SYSTEM

Filed Oct. 14, 1950 5 Sheets-Sheet 1

INVENTOR.
BERNARD D. LOUGHLIN
BY Laurence B. Dodds
ATTORNEY

COLOR TELEVISION INTERLACING SYSTEM

Filed Oct. 14, 1950 5 Sheets-Sheet 2

INVENTOR.
BERNARD D. LOUGHLIN
BY Laurence B. Dodds
ATTORNEY

Oct. 22, 1957 B. D. LOUGHLIN 2,810,780

COLOR TELEVISION INTERLACING SYSTEM

Filed Oct. 14, 1950 5 Sheets-Sheet 3

*INVENTOR.*
BERNARD D. LOUGHLIN

*BY* [signature]

ATTORNEY

Oct. 22, 1957 B. D. LOUGHLIN 2,810,780

COLOR TELEVISION INTERLACING SYSTEM

Filed Oct. 14, 1950 5 Sheets-Sheet 4

INVENTOR.
BERNARD D. LOUGHLIN
BY Laurence B. Dodds
ATTORNEY

COLOR TELEVISION INTERLACING SYSTEM

Filed Oct. 14, 1950 5 Sheets-Sheet 5

*INVENTOR.*
BERNARD D. LOUGHLIN
BY Laurence B. Dodds
ATTORNEY

United States Patent Office 2,810,780

Patented Oct. 22, 1957

2,810,780

COLOR TELEVISION INTERLACING SYSTEM

Bernard D. Loughlin, Lynbrook, N. Y., assignor to Hazeltine Research, Inc., Chicago, Ill., a corporation of Illinois Application October 14, 1950, Serial No. 190,186

5 Claims. (Cl. 178—5.2)

*General*

Figure 1:
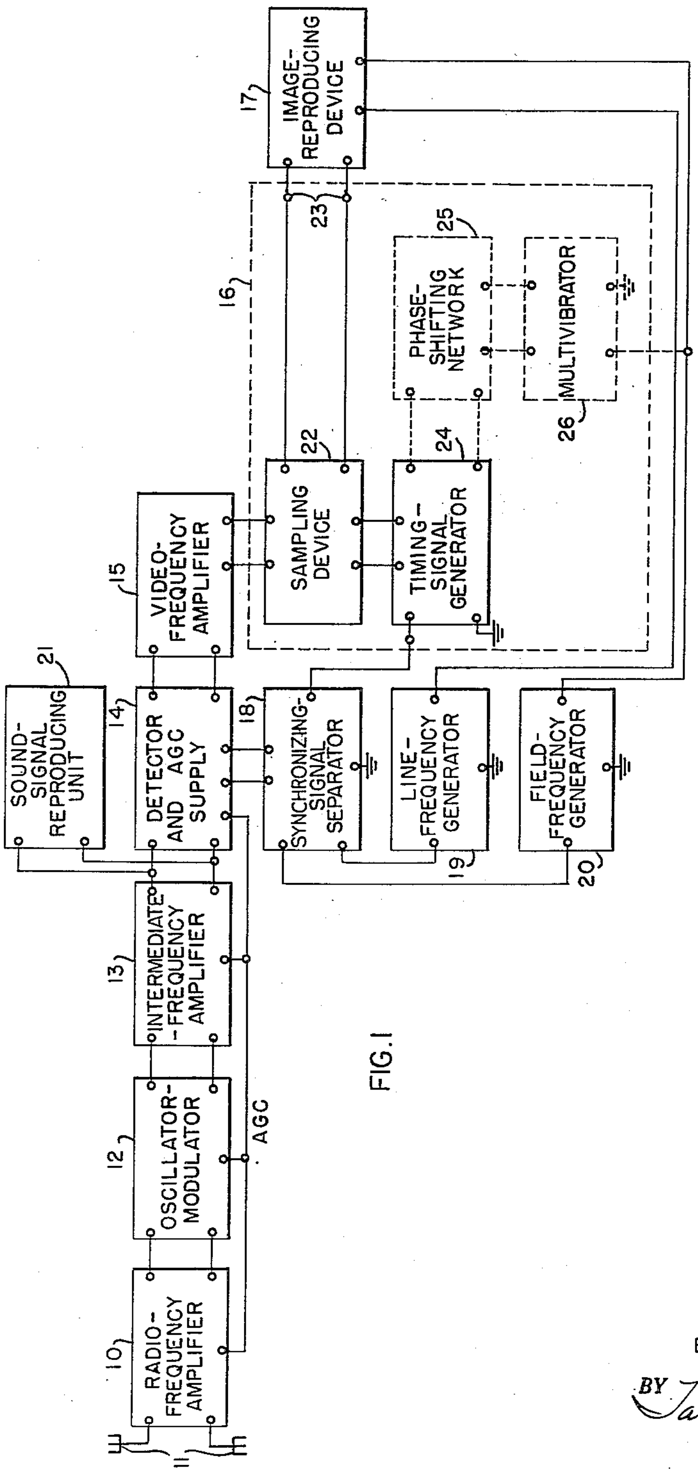

The present invention relates in general to television apparatus, particularly to signal-multiplexing systems for use in such apparatus for translating signals representative of an image, and especially to such systems as may be used in television transmitters and receivers. More particularly, the invention relates to new and improved signal-multiplexing systems useful in such transmitters and receivers and which have the characteristics of diminishing crawl and flicker effects occurring in the image reproduced in the receiver of a television system which is adapted to utilize the multiplexed signals. Such multiplexing systems also have the characteristic of effectively increasing the frequency-response characteristics in such television systems by such lessening of crawl effects, thereby improving the resolution of the reproduced image.

As previously used and as employed hereinafter, the expression "signal-multiplexing system" relates to a system for substantially simultaneous translation of at least two substantially independent groups of intelligence signals over a common intelligence link in such a manner as to permit the groups of signals selectively to be derived and applied to a signal-developing system at the transmitter which combines the signals to be multiplexed and/or a signal-detection system at the receiver which derives individual ones of the combined and multiplexed signals. In practice, at least one group of the intelligence signals may be translated effectively as modulation components of a subcarrier wave signal. The subcarrier wave signal may be of a type which is also translated over the transmission path or may effectively be suppressed at the transmitter and effectively reinserted at the reciever.

Also, as previously used and as employed hereinafter, the term "flicker" relates to the effect produced on the eye by the fluctuant light changes that occur when the number of stationary images which are used to reproduce a moving image in a given period of time is less than is required by the persistence-of-vision characteristic of the eye. Likewise, the term "crawl" relates to that effect produced by the appearance of moving waves in the reproduced image, the most bothersome of these waves usually appearing to move horizontally or vertically through the image. Such crawling is usually produced when the lines or elemental areas of a pattern in the image, as produced during several fields of each frame, follow each other in consecutive order and results from the presence of undesired or unneeded signals occurring in the image in such a manner that they do not effectively cancel but add in a horizontal or vertical sense. The undesired or unneeded signals, as will be explained more fully hereinafter, normally occur in the type of television systems under consideration, when the lines or grain structures of an interference pattern developed from undesired beating between desired signals become visible as the image is being viewed.

Conventional monochrome-type television broadcasting systems and compatible types of color-television broadcasting systems utilize a channel having a 4 megacycle pass band for the translation of video-frequency signals. The narrow limits of such a pass band determine the maximum amount of information that can be translated therethrough in a given period of time. However, ingenious arrangements have been devised to take advantage of the characteristic of the eye known as persistence of vision to translate more information over the channel by lengthening the period of time utilized to provide one frame or one complete image in the receiver.

One arrangement now in general use in conventional television systems utilizes interlaced-line types of scanning at the transmitter and receiver. In such an arrangement, the line-scanning frequency is usually made an odd multiple of one-half the field-scanning frequency so that the lines traced during one field of scan interlace or fall between the lines of a preceding field. Conventionally, two of such successive fields constitute a single picture frame representing a single complete image. Due to persistence of vision the eye sees twice the number of lines that any one field can produce, these lines being produced in twice the period of a single field and the picture definition is effectively increased. Also, due to the persistence of vision and the interlacing of the lines of each field, insofar as the large area flicker effects are concerned, there is produced in the image the effects of having twice the actual number of frames per second and of having increased vertical definition. The large area flicker effects are replaced by small area or interline flicker effects which are less bothersome to the eye.

Another more recent utilization of the persistence-of-vision characteristic of the eye to translate more information over a longer period of time without introducing large area flicker effects is an arrangement combining line interlace with dot or elemental area interlace in which a modulated subcarrier wave signal is, at least effectively, translated through the 0–4 megacycle pass band in addition to the conventional signals translated therethrough. Such an arrangement is described in a two-part article entitled "Dot Systems of Color Television" by Wilson Boothroyd and appearing in the magazine "Electronics" for December 1949 and January 1950 at pages 88–92, inclusive, and pages 96–99, inclusive, respectively. This arrangement is especially applicable to translating a much greater quantity of monochrome information or, in a color-television system, to translating both the monochrome and color information through a channel having a 4 megacycle pass band over a slightly more extended period of time than previously used.

In the arrangement under discussion, in addition to interlacing the lines in the manner described above, the information is also applied to the image screen of the cathode-ray tube at the receiver by means of a signal-sampling arrangement in an orderly arrangement of a series of intensity-modulated dots or elemental areas. While the lines are interlaced vertically, the dots are interlaced both horizontally and vertically and thus four fields are utilized to produce one picture frame or one complete image. The increase in the number of fields per frame, if a field frequency similar to that in the previously described system is used, would result in a decrease in the number of complete frames per period of time and thus would normally have a tendency to produce an increase in the amount of flicker present. By utilizing the line and dot interlacing, this tendency to produce flicker in the image as a whole is converted to a tendency to have flicker between the dots of the image. The interdot flicker, though objectionable, is less bothersome to the viewer than the large area flicker. In addition, due to the fact that the dots as well as the lines of the several fields of each frame may also follow each other vertically and horizontally in a consecutive order, the tendency for developing an interference pattern and crawling in the image is somewhat increased, especially if undesired signals are present.

To understand the reasons why undesired or unneeded signals normally occur in the dot-interlace type of system, it is helpful briefly to consider the theory of translating wide band information through a narrow pass band as more fully described in the "Electronics" article previously referred to. If, for example, it is desired to translate in a television system information normally requiring an 8 megacycle bandwidth through a 0–4 megacycle pass band, then, in accordance with the theory, the information to be translated is converted, at the transmitter, into pulses by means of a sampling device and translated over the 0–4 megacycle pass band in twice the time it normally would take to translate the same information over an 8 megacycle pass band. Such a sampling device would normally have a rate of operation of approximately 8 megacycles. Also, in accordance with the theory, the 0–4 megacycle information would then effectively pass through the sampling device as 0–4 megacycle signals and be translated through the 0–4 megacycle pass band. The 4–8 megacycle information, after being heterodyned with the 8 megacycle sampling signal, would be translated through the 0–4 megacycle pass band as the 0–4 megacycle lower portion of the lower side band of the modulated 8 megacycle signal. Since the frequency of the sampling signal is selected to be an odd integral multiple of one-half the line frequency, these side-band signals appear without further sampling at the receiver as an interference pattern having relatively low visibility in the reproduced image and tend to cancel one another on every other field thereof. Nevertheless, these signals do introduce crawling effects in the image and the interference pattern is not always effectively eliminated. By utilizing synchronized sampling at the receiver, these side-band signals are converted to high-visibility 4–8 megacycle information which is then utilized to provide high definition in the reproduced image. As an undesired effect of the sampling at the receiver, the 0–4 megacycle information is heterodyned with the 8 megacycle sampling frequency at this point to produce another interference pattern comprised of spurious and undesired 4–8 megacycle signals in the reproduced image thus further increasing the crawling effects therein. It has been found that, if the signal pulses representing the undesired and spurious information form on the image screen of the cathode-ray tube a conventional type of interference pattern having consecutive dots occurring in vertical and horizontal relationship to one another, there is a predominant crawling in the vertical direction which effectively causes such a pattern to be of higher visibility than it theoretically should be from the spatial relationship of the dots. The present invention is directed to reducing the visibility of these interference patterns.

It is noted that in the system just described, the 8 megacycle sampling signal was referred to as a signal which is modulated by the 4–8 megacycle intelligence signals. It should be understood that the 4–8 megacycle intelligence signals are translated to the receiver effectively as modulation components of the 8 megacycle sampling signal and that the latter signal may be considered to be a subcarrier wave signal which is effectively suppressed at the transmitter by the use of low-pass filter networks in the pass band and reinserted at the receiver by means of a synchronized local oscillator or timing-signal generator.

In place of the sampling signal of 8 megacycle frequency, a conventional type of subcarrier wave signal might have been employed. Since the pass band after the sampling is inherently limited to 0–4 megacycles, such a subcarrier wave signal would be suppressed and would have to be reinserted at the receiver. Though it is more difficult to visualize the presence of a dot interference pattern in the reproduced image when a continuous type of subcarrier wave signal of the conventional type is employed, such dot structure is present and is caused by the spurious effects resulting from the transmission of both 0–4 and 4–8 megacycle information over the same 0–4 megacycle pass band. The pattern structure relates to the peak amplitudes of the subcarrier signal and the spurious effects are produced by the occurrence on the screen of the cathode-ray tube of intensity-modulated dots corresponding to the spurious signals and appearing in an interference pattern determined by the relationship of the frequency of the subcarrier wave signal to the line-scanning frequency.

When the so-called "dot interlace" system is utilized in a color-television system to translate color and monochrome information instead of high-resolution information, the operation of the sampling device and the consideration of the timing signal which controls the frequency of the sampling device as a subcarrier wave signal must be modified. In order to transmit color information based on three primary colors, at least two independent groups of information, in addition to the resolution information which is conventionally present, must be transmitted. The manner in which such additional information is transmitted and utilized is explained in some detail in the RCA Review for December 1949, volume X, No. 4, at pages 504–524, and in somewhat lesser detail hereinafter with relation to a color-television system to be described. Essentially, the sampling device which, in the "dot interlace" system was arranged to permit the translation of high-resolution information, is arranged to translate information relating to at least two colors. To effect this result, the sampling signal is effectively modulated in amplitude by the color signals at differential sequential phase points of the sampling signal. One piece of transmitted information, therefore, relates to the amplitude and one relates to the phase of the suppressed subcarrier wave signal related to the sampling signal. In view of this, the color-television system employing sampling may be called a "dot sequential" system since there is a predetermined sequence of dot information related to the phase of the suppressed subcarrier wave signal. Also, since the latter signal is effectively modulated both in amplitude and phase, it may be considered to comprise two subcarrier wave signals having the same frequency but in phase-quadrature relationship, both being modulated in amplitude by different groups of intelligence signals.

Instead of a sampling or "dot sequential" type of arrangement, the two subcarrier wave signals may be arranged to be of different frequencies and either of the suppressed type, wherein the subcarrier wave signal itself is not transmitted, or of the conventional transmitted type. Also, the subcarrier wave signals may have frequencies which are either within or too high for the pass band of the system. Such a system may be designated as a "band-sharing" system since the pass band is shared by the fundamental or conventional group of signals and by two subcarrier wave signals either suppressed or transmitted and each modulated by different groups of intelligence signals.

It will be seen that, with the many extra subcarrier wave signals in the pass band, the problem of spurious and undesired signals producing an interference pattern in the reproduced image is increased due to the beating of these extra signals with each other and with the desired signals. Some means is desired for effectively eliminating this inteference pattern and the present invention is directed to such a purpose.

In the so-called "dot interlace" and "band-sharing" arrangements of the types just discussed, theoretically the amount of information that can be translated through a pass band having a given bandwidth can be greatly increased. Also, theoretically, such signal-translating facility may be utilized to give greatly improved definition in the reproduced image. However, as a practical matter, the increase in flicker and crawl effects, principally due to the presence of interference patterns, is more bothersome in the higher definition parts of the image so that in prior art arrangements there is not as great an increase in definition as should be expected. The average eye findts it difficult to resolve the higher definition portions due to the higher visibility of the interference pattern and the image as a whole may therefore appear to be degraded.

In conventional types of television systems utilizing horizontal line scanning, in a reproduced image there is much greater definition between adjacent areas or lines placed diagonally across the image than between adjacent horizontal or vertical areas or lines. Since it is a characteristic of the human eye that vertical and horizontal lines and patterns appear to be more visible than diagonal lines or patterns, it is desirable to convert this improved diagonal definition into vertical and horizontal definition, thereby effectively increasing the resolution and definition of the reproduced image as viewed by the eye while, at the same time, effecting a low-visibility interference pattern.

It is an object of the present invention, therefore, to provide, particularly for use in a television system, a new and improved signal-multiplexing system which avoids one or more of the above-mentioned limitations of arrangements of the type described.

It is another object of the present invention to provide a new and improved signal-multiplexing system, particularly for use with a television receiver, which permits a reduced pass band to be utilized without impairment of the definition of an image, or an improved definition may be procured for a given pass band, or both, substantially without crawl or flicker effects.

It is still another object of the present invention to provide in a television system a new and improved signal-multiplexing system which provides improved horizontal definition of the reproduced image without changing the frame frequency as utilized by conventional television systems.

It is an additional object of the present invention to provide in a color-television system a new and improved signal-multiplexing system whereby more information may be translated over a given pass band in a given time and with an improved definition.

It is still an additional object of the present invention to provide in a color-television system of the dot sequential type a new and improved signal-sampling system in which signals related both to the color characteristics and signals related to the brightness characteristics of an image are sampled.

It is also an additional object of the present invention to provide a new and improved signal-multiplexing system which may be utilized in a television system in conjunction with a pass band capable of translating substantially less information than the pass bands associated with prior art television systems to obtain a similar amount of definition as obtainable by means of such prior art systems.

Additionally, it is an object of the present invention to provide in a band-sharing type of television system a new and improved signal-multiplexing system whereby more information may be translated over a given pass band in a given time and with an improved definition.

For a better understanding of the present invention, together with other and further objects thereof, reference is had to the following description taken in connection with the accompanying drawings, and its scope will be pointed out in the appended claims.

Figure 5:
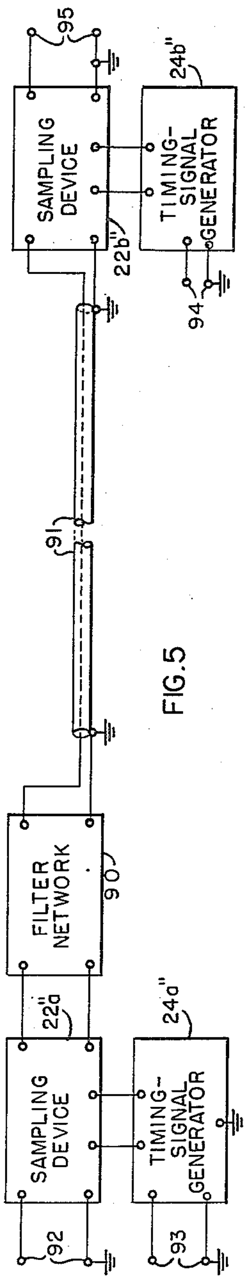
Figures 2, 11:
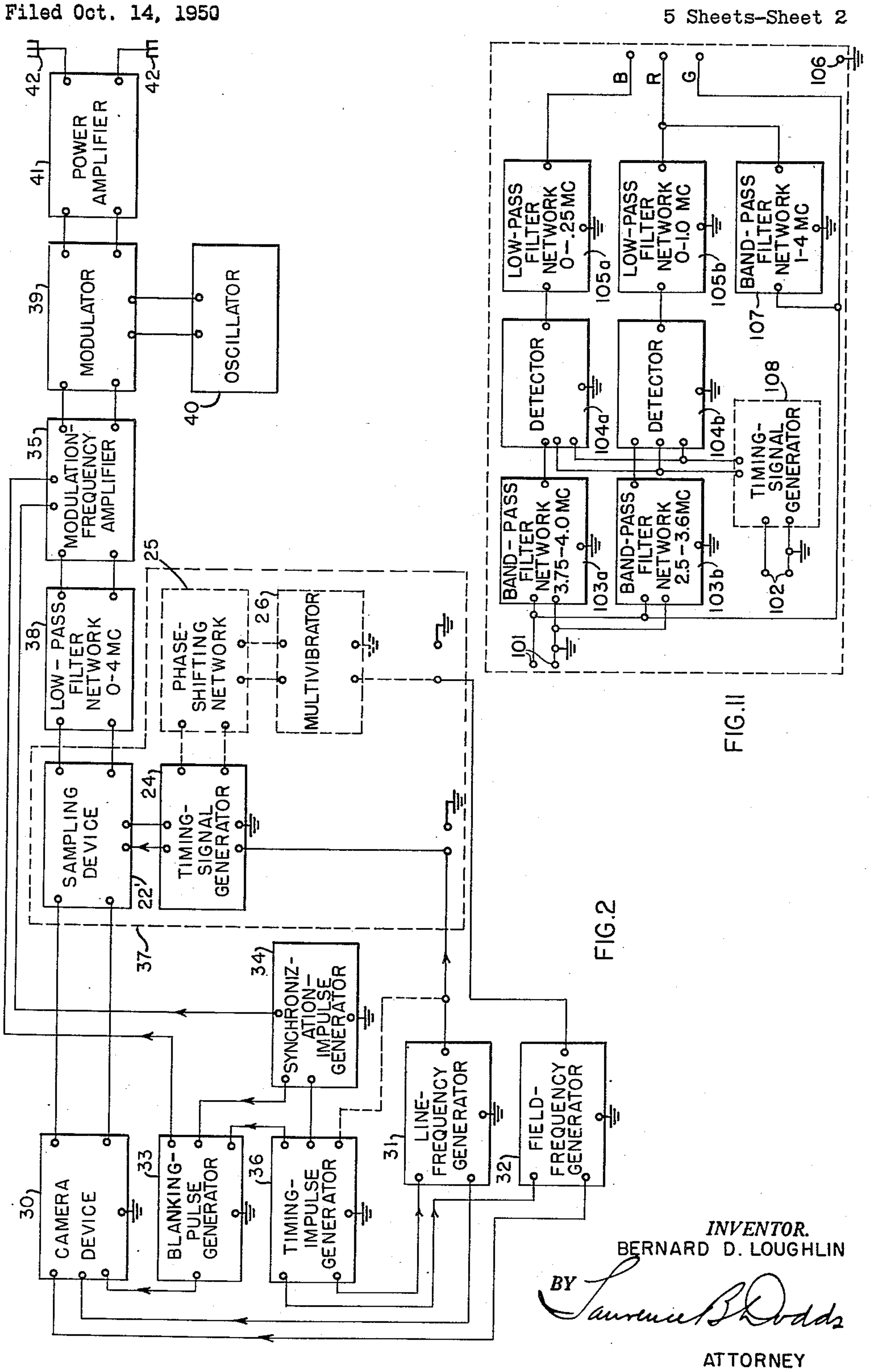
Figure 3:
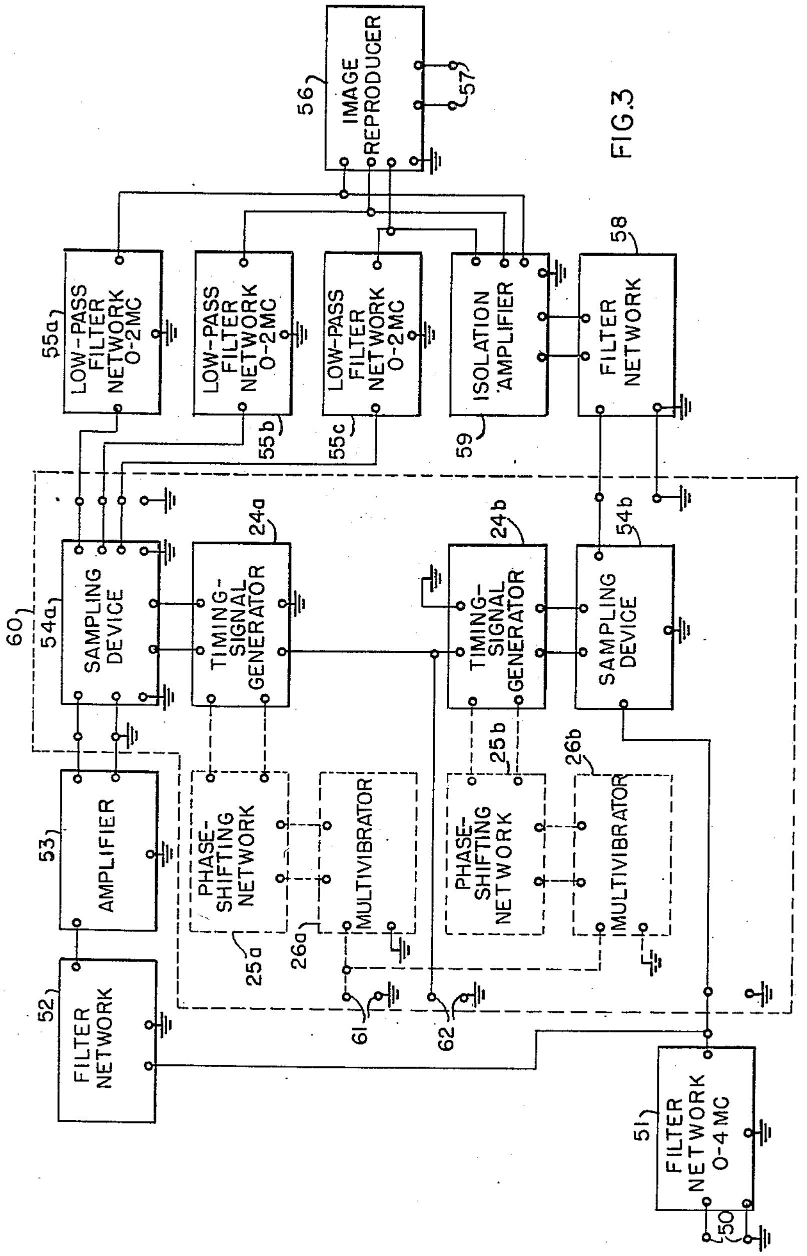
Figure 4:
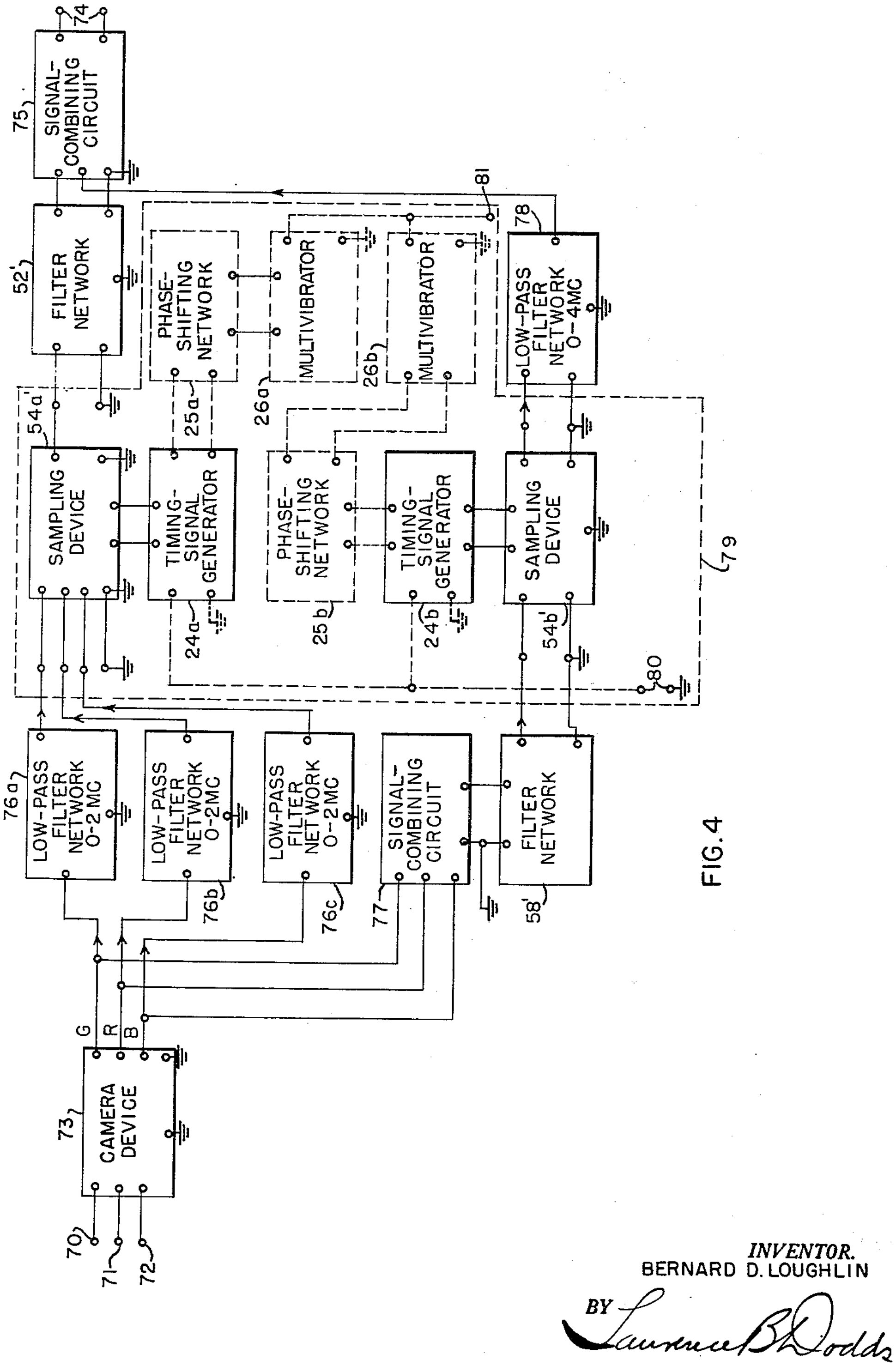

In the drawings, Figs. 1 and 2 are schematic diagrams of a receiver and transmitter, respectively, of a complete television system embodying the inventive signal-sampling system in one form; Figs. 3 and 4 are schematic diagrams of portions of a color-television receiver and transmitter, respectively, of an additional television system embodying the invention in another form; Fig. 5 is a schematic diagram of a signal-translating apparatus embodying the invention in a modified form; Figs. 6–10, inclusive, are diagrammatic representations of different interference patterns useful in explaining the invention; and Fig. 11 is a schematic diagram of a portion of another type of color-television receiver embodying the invention in another form.

*General description of television receiver of Fig. 1*

In describing the invention, reference will be made first to the receiver, since the signal to be transmitted is determined by the operating characteristics of the receiver. Referring now to Fig. 1 of the drawings, there is represented an apparatus, specifically a monochrome type of television receiver, which is a component of a system for translating and utilizing a signal having an electrical characteristic which varies with time and which represents at least a light characteristic of an image scanned by a pickup device at the transmitter at a predetermined frequency in a sequence of lines. The receiver comprises means for receiving and selecting a wave signal modulated by the signal just described and for detecting that signal. This means includes a radio-frequency amplifier 10 of any desired number of stages having its input circuit connected to an antenna system 11, 11 and having an output circuit which is coupled in cascade, in the order named, with an oscillator-modulator 12, an intermediate-frequency amplifier 13 of one or more stages, and a detector and automatic-gain-control (AGC) supply unit 14. The receiver also includes, connected in casacade to the output circuit of the detector 14, a video-frequency amplifier 15, a signal-detection system 16 to be described in more detail hereinafter, and an image-reproducing device 17 of a conventional cathode-ray-tube type. The output circuit of the amplifier 15 comprises a source of a composite signal, specifically, a video-frequency signal including a modulated sub-carrier wave signal developed at a transmitter from components of at least one signal which represents a light characteristic, for example, the brightness characteristic of an image scanned at a predetermined frequency in a sequence of lines. The device 17 includes a complete cathode-ray-tube circuit, an image screen on the cathode-ray tube and conventional beam-deflecting windings.

There is also coupled to the detector 14 a means, operative in synchronous relation with a scanning means at the television transmitter when a television signal is being utilized in the receiver, for scanning the image screen in the device 17 in a sequence of lines and for developing on the screen a pattern representative of the televised image, this pattern undesirably tending to include an interference pattern of dots. This means includes a synchronizing-signal separator 18 having an input circuit coupled to an output circut of the detector 14 and output circuits connected with a line-frequency generator 19 and a field-frequency generator 20, the output circuits of which are connected with the beam-deflecting winding in the device 17. The output circuits of the units 18, 19 and 20 may also be connected to terminals in the system 16 for utilization of the signals developed in these units in a manner to be described in more detail hereinafter. The output circuit of the (AGC) supply included in the unit 14 is connected to the input circuits of one or more of the tubes of the radio-frequency amplifier 10, the oscillator-modulator 12, and the intermediate-frequency amplifier 13 in a well-known manner. A sound-signal reproducing unit 21 is also connected to the output circuit of the intermediate-frequency amplifier 13 and may have stages of intermediate-frequency amplification, a sound-signal detector, stages of audio-frequency amplification, and a sound-reproducing device.

It will be understood that the various units thus far described with reference to the receiver of Fig. 1, with the exception of the signal-detection system 16, may have any conventional construction and design. The details of such units are well known in the art rendering a further description thereof unnecessary.

*General operation of receiver of Fig. 1*

Considering briefly the operation of the receiver of Fig. 1 as a whole and assuming for the moment that the signal-detection system 16 is a conventional signal-translating device or an additional stage of the video-frequency amplifier 15, a desired modulated television wave signal is intercepted by the antenna system 11, 11. The signal is selected and amplified in the radio-frequency amplifier 10 and applied to the oscillator-modulator 12 wherein it is converted into an intermediate-frequency signal. The intermediate-frequency signal is then selectively amplified in the amplifier 13 and supplied to the detector 14 wherein its modulation components are derived. These modulation components include a signal having an electrical characteristic which varies with time and which represents at least a light characteristic of an image scanned by a pickup device at the transmitter at a predetermined frequency in a sequence of lines. Specifically, the components of the modulation signal comprise video-frequency as well as synchronizing-signal components. The video-frequency components including the representative signal just discussed are amplified in the amplifier 15, translated through the unit 16, and applied to the control electrode of the cathode-ray tube in the unit 17 to modulate the intensity of the electron beam in the tube in accordance with the amplitude variations of the applied signals.

The synchronizing-signal components are separated from the video-frequency components in the separator 18 and are used to synchronize the operation of the line-frequency and field-frequency generators 19 and 20, respectively. These generators supply signals of saw-tooth wave form which are properly synchronized with reference to the received television signal and applied to the deflecting means of the cathode-ray tube in the image-reproducing device 17, thereby scanning the target screen in the cathode-ray tube in a sequence of lines by deflecting the cathode-ray beam in two directions normal to each other and reproducing the image being televised by the transmitter.

The automatic-gain-control or (AGC) signal derived in the unit 14 is effective to control the amplification of one or more of the units 10, 12 and 13 to maintain the signal input to the detector 14 and to the sound-signal reproducing unit 21 within a relatively narrow range for a wide range of received signal intensities. The sound-signal modulated wave signal having been selected by the unit 10, converted to an intermediate frequency in the unit 12, and translated through the unit 13 is applied to the unit 21. Therein it is amplified and detected to derive the sound-signal modulation components which may be further amplified and then reproduced in the reproducing device.

*Description of signal-detection system of Fig. 1*

Referring now particularly to the signal-detection system 16 embodying one form of the present invention and being the receiver of a signal-multiplexing system in accordance with the invention, the system 16 includes a multiplex-signal detection or sampling device 22 having an input circuit coupled to the output circuit of the unit 15 and an output circuit coupled through terminals 23, 23 to a control electrode and cathode in the dievice 17. A detection or sampling device of a type that may be utilized herein is more fully described in the "Electronics" article previously referred to. The device 22 by means of the coupling between the device and the unit 15 is responsive to the image-representative signal for periodically deriving therefrom a plurality of signals individually related to the light characteristics of the image to be reproduced and, incidentally, subject to derive spurious and undesired signals which tend to produce an interference pattern in the reproduced image.

The system also comprises means for controlling the sampling device to derive in the output circuit thereof the plurality of signals developed at the transmitter. More specifically, such controlling means comprises a signal-generating apparatus or timing device for generating a signal having a frequency of approximately a harmonic of one-half line frequency and which varies in phase in a predetermined regular manner with respect to the lines. The timing device comprises in one arrangement a timing-signal generator 24, and in another arrangement the unit 24, a phase-shifting network 25, and a multivibrator or switching circuit 26 coupled in cascade in the order named. The units 25 and 26 and the conductors connecting the units 25 and 26 are represented in a broken-line manner to indicate that these units and connections may be utilized but also may not be required. An output circuit of the unit 24 is coupled to a control circuit of the sampling device 22 and an input circuit of the unit 24 is coupled to an output circuit of the synchronizing-signal separator 18 to derive therefrom a signal related in frequency to the line frequency. The input circuit of the multivibrator 26 is coupled to an output circuit of the field-frequency generator 20. The timing device, either unit 24 or units 24, 25 and 26, has parameters so proportioned as to develop a timing signal having an average frequency such that the device 22, when the timing signal is applied thereto by the generator 24, periodically derives the signals related to the light characteristics in such a manner that, in the interference pattern, the elemental areas have the centers thereof displaced along at least one of the scanning lines on the image screen in the device 17 with reference to the centers of substantially all the elemental areas on at least an adjacent scanning line in space on the same screen. In particular, the generator 24 may be an adjustable-frequency generator adapted to be controlled by a signal developed at the transmitter and applied to the unit 24 from the output circuit of the unit 18 to generate a signal having a frequency which effectively differs from an integral multiple of line frequency by an odd integral multiple of one-half the field frequency. For example, the signal generated in the unit 24 may have a frequency of approximately 7.6 megacycles. If the units 25 and 26 comprise part of the timing device, then the unit 24 is proportioned to generate a signal having a frequency which is an integral multiple of the line frequency and the unit 25 is proportioned to vary the phasing of that frequency in relation to the field frequency under the control of the multivibrator 26 to obtain a 180° dot displacement in successive fields.

The term "an adjacent scanning line" as used herein and in the appended claims is intended to mean a line which is positioned adjacent to another scanning line after a complete line interlace cycle has occurred in reproducing the image in the device 17. Such description in a line interlace system defines the position relationship between a line scanned in one field and the adjacent line scanned in the next field. The term is meant to distinguish over the adjacent relationship which occurs between lines in the same field which lines might be designated as being "adjacent lines in time."

The terminals 23, 23 in conjunction with the output circuit of the device 22 provide a means for applying signals derived in the device 22 to the device 17 to reproduce on the image screen thereof an image formed by the light characteristics of the plurality of signals in such a manner that in the interference pattern inherently developed in such multiplexing systems the elemental areas of the pattern on at least one of the scanning lines have their centers displaced along the one line with reference to the centers of substantially all the elemental areas on at least an adjacent line in space thereby effectively being of low visibility in the reproduced image.

*Explanation of operation of signal-detection system of Fig. 1*

Before considering the operation of the system 16, it will be helpful briefly to consider the interference patterns represented by Figs. 6–10, inclusive. These figures represent different patterns of the elemental areas or dots related to the spurious and undesired signals developed in the manner previously described and which form an interference pattern on the image screen of a cathode-ray tube at the receiver during the reproduction of the image. If the interference pattern is of a high-visibility type (i. e. is easily seen), it prevents the viewer from resolving the high-definition portions of the image. It is desired to make the pattern of a very low visibility type and thereby effectively increase the definition of the image.

Though indicated as separate areas or dots, it will be understood that the dots in the interference pattern, through substantially discrete from one another, may overlap to at least some extent. It is also to be understood that the dots are laid down or scanned at a rate related to the sampling frequency since the latter is synchronized with the subcarrier wave-signal frequency. For the purpose of consistency and so that all patterns may be to the same scale, it may be assumed that the patterns of Figs. 6–10, inclusive, are laid down at the same sampling (subcarrier) frequency, for example, at a frequency of 7.6 megacycles per second. With respect to all of these patterns it is to be remembered that, if other factors permit, changing the sampling frequency alters the coarseness of the pattern by varying the amount of spacing between the dots on the same scanning line. It also, similarly, affects the definition of the image. The numerals placed within the circled areas indicate the field order in which these areas or dots are laid down, the highest number indicating the total fields utilized per frame to form one complete image. Thus all of the dots designated by the reference number (1) in the circled area, in any one figure, are laid down during the first field of scan. The dots designated by the numeral (2) are laid down during the second field of scan and so forth.

In the discussion which follows it is to be remembered that the patterns represented by Figs. 6–10, inclusive, are patterns which result from multiplexing of the signals translated through the 0–4 megacycle pass band of the television system, which undesirably appear on the image screen and which are to be made of as low visibility as possible. These patterns are incidental to the reproduction of the image and staggering the elemental areas of the patterns will not harmfully affect the reproduced image but will improve it. As previously mentioned, the improvement results from the effective elimination of spurious effects thereby permitting the image to have the full definition of which the system is capable.

Before considering the relation of some of the above-discussed patterns to the system 16, some facts relating to the physiological properties of the eye should be stated. It is well known that the human eye is normally incapable of integrating into one composite image portions of that image that require a time appreciably greater than approximately 1/30 of a second to produce. Thus in a sixty-cycle type of field-scanning system, if four fields are utilized to scan one frame then the resultant fifteenth of a second frame frequency would normally be too low in frequency to permit the human eye to integrate the four fields into the one frame to form the one complete image. The structure or pattern utilized to produce the image begins to become visible. Though prior art arrangements have attempted by means of different types of interlaced scanning systems to offset the effects of this low-framing frequency, interdot flicker caused by such low-framing frequency still does exist, thus inherently making the dot structure of the image visible to the observer.

In addition to the integration characteristics of the human eye, it has recently been demonstrated by experiment that horizontal or vertical lines and effects produced along such lines appear to be more visible than similar lines or effects along diagonals. For a normal upright position of the head, the human eye appears to be least sensitive to lines occurring at angles to the horizontal or vertical, and apparently is less affected by spurious motions occurring along such diagonal lines. Thus if the crawling motions that occur in the horizontal and vertical portions of a reproduced image can be made to occur along sloping lines at some angle to the horizontal or vertical planes, these effects are reduced. The interference pattern should be of a staggered or checkerboard form. The eye being then unaffected by the spurious motions effectively is able to resolve portions of the image having greater definition than it was previously able to resolve. In addition to the characteristics just mentioned, if a dot interlaced type of scanning is being utilized, the eye is capable of filling in spaces between the interlaced dots to integrate the dot structure into a complete image if certain prerequisites are met. Thus if the sampling frequency is sufficiently high or if a low sampling or subcarrier frequency is compensated for by a system of dot interlace such that a sufficient number of dots are produced on the image screen so that they cannot be resolved optically by a viewer at a normal viewing distance, then it becomes unnecessary and inefficient to fill in the spaces between the dots.

Figure 6:
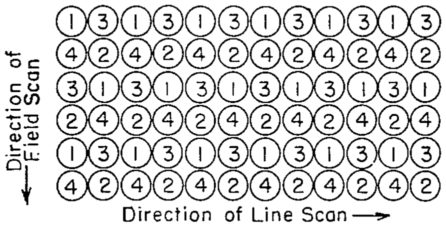
Figure 7:
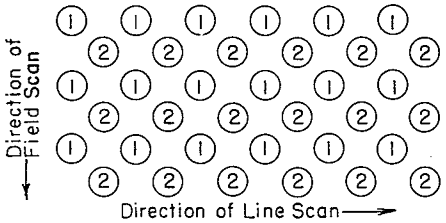

The operation of the receiver component of the signal-multiplexing system, in particular the sampling system 16 just described, may best be understood by first considering the image-reproducing patterns of Figs. 6 and 7. The pattern represented by Fig. 6 represents a type of pattern described on page 98 of that part of the article in "Electronics" as referred to above which appears in the January edition thereof. Though this pattern is specifically described in that article with relation to a color-television system, the article also describes the utility of a sampling system that would produce such a pattern for the transmission of monochrome signals having frequencies higher than the pass band through which the signals are to be translated. For use with monochrome signals, the pattern would be the same as that represented on the page referred to if only one color of the color display is considered except that the sampling frequency would be increased and therefore the dots of the one color would appear closer together. At this time the pattern represented in Fig. 6 will be considered as a pattern utilized to reproduce such high-frequency monochrome information and as a pattern which, after being utilized to effect translation of much higher definition information than could be translated over the same pass band by other means, should not have a high visibility on the image screen.

A very casual study of the pattern of Fig. 6 will immediately indicate that four fields are being utilized to reproduce information pertaining to one complete image, therefore requiring a frame frequency in a conventional television system of 15 frames per second. As a result, there is a tendency for interdot flicker effects to occur in the reproduced image due to the pattern structure and the frame frequency. In addition, it will be noticed that the dots occurring in consecutive fields have a tendency to be placed in a vertical consecutive order. Thus in the first vertical group of dots, there is the sequence 1, 2, 3, 4 reading from bottom to top. Because of this type of sequence, as previously explained with respect to the interlacing of consecutive lines or dots, there is a tendency for vertical crawling in the reproduced image. The flicker and crawling produce bothersome effects on the human eye which, due to the inability of the human eye to resolve the higher definition portions in the presence of these effects, effectively diminish the maximum resolution that can be obtained in the reproduced image. Though the pattern of Fig. 6 theoretically should be of a low-visibility type, the predominant vertically crawling effects cause it to be of a higher visibility type.

The pattern represented by Fig. 7 is a low-visibility one obtainable by sampling of the type practiced in accordance with the present invention, for example by utilizing a sampling frequency which is effectively $220 \times 15{,}750 + 30$, and effectively overcomes the deficiencies and limitations of the type of sampling practiced with reference to the pattern of Fig. 6. The pattern of Fig. 7 makes the utmost use of the characteristics of the eye previously considered. Thus, though only one-half as many dots are produced and therefore only one-half the information need be translated to form one complete image as was translated with reference to a pattern of the type of Fig. 6, a sufficient number of dots are utilized to form the image so that the eye can integrate the dots to fill in the spacings occurring therebetween. The pattern represents the finest grained dot structure that can be formed on the image screen during the effective integration period of the eye and, being of a staggered type, has low visibility.

While the pattern of Fig. 6 includes more information than is included in the pattern of Fig. 7, both patterns provide the same amount of vertical and horizontal resolution since they have the same number of horizontal and vertical lines. The additional information included in the Fig. 6 pattern, however, adds only to the diagonal definition of the reproduced image, since more diagonal lines per given distance are included in the Fig. 6 pattern than are included in the Fig. 7 pattern. As has previously been stated, the eye is incapable of utilizing this diagonal definition and thus the increased information in the Fig. 6 pattern is wasted. In addition, since the additional dots in the Fig. 6 pattern are instrumental in causing a frame frequency of fifteen cycles per second to be used, they cause an increase in interdot flicker thereby degrading the resolution of the image. Such is not the case in the Fig. 7 pattern.

When using a pattern such as that of Fig. 7, since only one-half the previous amount of information need be translated in a given period of time to complete one image, the frame frequency can be doubled to translate the same information in one-half the time, thereby greatly diminishing the interdot flicker effects in the reproduced image. By utilizing a pattern of the type represented by Fig. 7 as compared to that of Fig. 6, the theoretical limit of the amount of information useful to the human eye that can be translated through a given pass band in a given period of time is more nearly approached and a reproduced image which is more pleasing than that of an image produced in accordance with the pattern of Fig. 6 is obtained.

In addition to the advantages of utilizing a pattern such as that represented by Fig. 7 as discussed above with reference to other dot interlace systems, the pattern of Fig. 7 also retains all of the advantages of dot interlace systems in general over line interlace systems. These advantages are obtained even though the framing frequency of both the pattern of Fig. 7 and of conventional line interlace systems is the same, thus forming one complete image in equal amounts of time. Again these improvements are attained by translating only information that is usable to the human eye and eliminating all other information which wastes time and may cause undesired spurious effects resulting in a high-visibility interference pattern.

A conventional type of line interlaced system is capable of translating for reproduction 4 megacycles of information and definition through a 4 megacycle pass band in a given period of time. A system utilizing a pattern such as that of Fig. 7 is capable of translating for reproduction approximately 8 megacycles of information through a similar channel in the same period of time in a manner similar to that previously described. This is attained by not utilizing in the pattern of Fig. 7 that portion of the total information, the information in the line interlaced system which provides high diagonal definition, which is unusable by the human eye, and is therefore wasted. The pattern of Fig. 7 effectively transfers this high diagonal definition into high horizontal and vertical definition by staggering the dot structure in the manner shown.

The signal-detection system of Fig. 1 is structurally arranged to produce a pattern such as that of Fig. 7. Video-frequency signals having an electrical characteristic which varies with time and which represents the light characteristic of an image scanned at a predetermined frequency in a sequence of lines are applied to the sampling device 22 from the amplifier 15. The sampling device 22 has a sampling frequency controlled by the timing-signal generator 24 which may be, in turn, controlled by the phase-shifting network 25 and the multivibrator 26. The frequency of the sampling device 22 is such that it periodically derives from the video-frequency signal applied thereto a plurality of signals and an interference pattern inherently associated therewith which has discrete elemental areas thereof displaced along each scanning line of the image. Thus the elemental areas represented by the numerals (1) and (2) in the pattern represented by Fig. 7 are derived. Further, the sampling device 22 derives the plurality of signals in such a manner that, in the interference pattern, the elemental areas on one line have their centers displaced along that line with reference to the centers of substantially all the elemental areas on at least an adjacent line in space to produce a low-visibility pattern. Thus, along the first line in the interference pattern represented by Fig. 7, only those dots or elemental areas represented by the numeral (1) occur which have their centers displaced with reference to the centers of all the elemental areas represented by the reference numeral (2) occurring on the adjacent scanning line in space.

The signals derived in the device 22, including the inherent spurious and undesired signals which cause the interference pattern, are applied to the terminals 23, 23 to be utilized in the image-reproducing device 17 to produce an image having relatively high definition and having a low-visibility interference pattern composed of a dot structure of the type represented in Fig. 7.

Though the operation of the signal-sampling system 16 of Fig. 1 has been explained with reference to control signals applied to the generator 24 from the synchronizing-signal separator 18 and to the multivibrator 26 from the field-frequency generator 20, it will be understood that the application of such signals is solely for the purpose of maintaining the sampling frequency and the line and field frequencies in proper timing relationship with respect to one another. Such timing relationship is required in order to have the elemental areas occur on the image screen of the cathode-ray tube in a pattern of the type represented by Fig. 7. It will be understood that any type of control signal may be applied to the generator 24 and thus to the device 22 which will maintain the proper timing relationship between the frequency and phase of the device 22 and that of the signals generated in the units 19 and 20. It is conceivable that such a timing signal might separately be transmitted and applied to the generator 24 to effect the proper timing relationship. Additionally, such a signal might be applied to the generator 24 to effect a control on the frequency and phase of the signal developed by this generator and the line and field frequencies could then be obtained as subharmonics of the timing signal.

If it is assumed that the generator 24 develops a frequency which ordinarily would cause the sampling device 22 to sample signals applied thereto at the same point on each scanning line, thus causing the dots in the interference pattern to occur in vertical relationship to one another, then a phase-shifting network 25 periodically controlled by a multivibrator 26 which is, in turn, under the control of the field-frequency generator 20 may be utilized to vary the phasing of the signal developed in the generator 24 on every other field. In such a case, a pattern of the type represented by Fig. 7 will also be produced. Other means of controlling the generator 24 may be utilized as described above including developing a signal in the generator 24 which effectively differs from a multiple of line frequency by an odd multiple of one-half the field frequency. Such a frequency will automatically cause a sampling device to operate in a manner that will vary from field to field to produce a pattern of the type represented by Fig. 7.

The desirable characteristics of a pattern of the type represented by Fig. 7 have been described above. Improved resolution in the reproduced image by further diminishing undesired interdot crawling effects, increasing the horizontal definition and lowering the visibility of the pattern in any one field can be obtained by producing a pattern of the type represented by Fig. 8.

Figure 8:
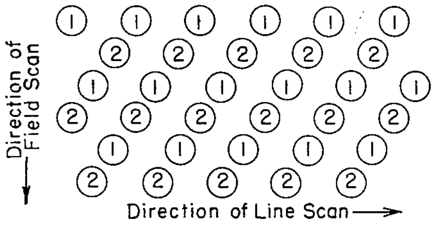

The pattern of Fig. 8 may be called an asymmetrical staggered dot pattern in that the diagonals from left to right in the pattern as represented do not include the same dot elements as diagonals of similar angles from right to left in the pattern. Because of this feature and of the very coarse and staggered nature of the pattern structure during any one field, the pattern has very low visibility in any one field and the tendency to crawl therein is reduced. In addition, the horiontal definition of the image is increased over that of a pattern such as Fig. 7 by a factor of one-half since there are three vertical lines in the pattern of Fig. 8 where there are only two in the pattern of Fig. 7 for the same horizontal distance corresponding to a sampling cycle. These features combine to give increased definition and increased freedom from crawling effects. With adequate high-frequency scanning and sampling at the transmitter, the conventional pass band of 4 megacycles, and high-frequency sampling at the receiver, the pattern of Fig. 8, in accordance with the theory previously considered, may be utilized effectively to reproduce an image having horizontal definition approximately equivalent to that available by using a 12 megacycle pass band. A pattern such as that of Fig. 7 produces an image having horizontal definition approximately equivalent to that available with an 8 megacycle pass band. The pattern of Fig. 8 is obtainable, for example, by utilizing a sampling frequency of $$220 \times 15{,}750 + \frac{15{,}750}{3}$$

Figure 9:
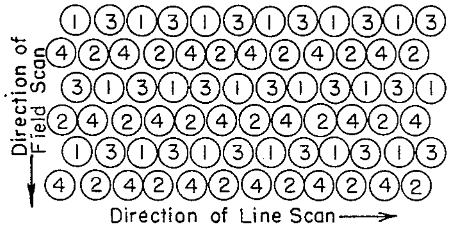

The pattern of Fig. 9 is similar to the pattern of Fig. 7 except that four fields are used per frame to double the amount of information per image and thus improve the definition of the image though also increasing the interdot flicker effects. By staggering the dots as shown in Fig. 9 the horizontal resolution of the image is further improved by effectively doubling the number of vertical lines per given horizontal distance effectively to give a definition approximately equivalent to that available when using a 16 megacycle pass band. The effect of any crawling effects that do occur is diminished since there is no predominant crawling in any one direction in the pattern. The pattern of Fig. 9 is obtainable, for example, by utilizing a sampling frequency of $$\frac{441}{2} \times 15{,}750$$

shifted in phase on every other line by plus or minus 90°. This pattern will be further considered hereinafter.

Figure 10:
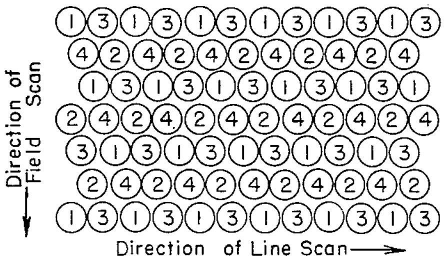

The pattern of Fig. 10 bears the same relation to the pattern of Fig. 8 as the pattern of Fig. 9 bears to that of Fig. 7. The spaces in the pattern of Fig. 8 are filled in by utilizing four fields per frame and thus the amount of information per image is doubled though the frame frequency is halved. Effectively a definition approximately equivalent to that available when using a 24 megacycle pass band is obtained. As in Fig. 9, any interdot flicker effects that would normally be increased by such low-frame frequency are effectively reduced by causing such flicker effects to occur in opposing manner so as to be less bothersome to the eye. The pattern of Fig. 10 is obtainable by adding or subtracting thirty cycles from the sampling frequency utilized to obtain the pattern of Fig. 8. This pattern will also be considered in more detail hereinafter.

It will be seen that the patterns of Figs. 8–10, inclusive, may be produced by proportioning the circuits that control the timing-frequency generator 24 or the generator itself of Fig. 1 so that the sampling device 22 of Fig. 1 derives from the signal applied thereto only those signals which represent the image to be reproduced which will conform to the pattern then being used. The manner of proportioning circuits of this type or the frequency of operation of the generator 24 is well known and will not be considered in detail herein. In practice, and as an example of how the sampling device may be operated, if the pattern of Fig. 8 is to be utilized, the timing of the sampling device 22 may be varied continuously during each field, effectively having a sampling frequency which varies from an integral multiple of line frequency by an amount equivalent to one-third of line frequency.

*Description of television transmitter of Fig. 2*

Referring now more particularly to Fig. 2 of the drawings, there is represented an apparatus, specifically a television transmitter for producing and transmitting the type of video-frequency signals which might be utilized in the receiver of Fig. 1 and particularly in signal-sampling systems of the types described with reference to Fig. 1. The transmitter comprises means for analyzing an image to be transmitted in a sequence of lines at a predetermined frequency to develop a signal representative of a light characteristic of the image. This means comprises a camera device 30 for generating the representative signal during trace periods. This device may be of conventional design including a cathode-ray tube having the usual electron-gun structure and photosensitive target and line-scanning and field-scanning means. The means for analyzing also includes a line-frequency generator 31 and a field-frequency generator 32 having individually one of their output circuits connected directly to the line-scanning and field-scanning circuits in the device 30. In order to provide blanking pulses for blocking use or for suppressing undesirable pulses in, and ensuring the proper wave form of, the representative signal developed in the unit 30, there is provided a blanking-pulse generator 33 having an output circuit coupled to the control electrode of the cathode-ray tube in the unit 30. A synchronization-impulse generator 34 is also provided for developing synchronizing impulses for modulating the signal to be transmitted thereby effecting synchronization between the transmitter and the receiver. An output circuit of the generator 34 is connected to a modulation-frequency amplifier 35, another output circuit thereof being connected to the blanking-pulse generator 33. In order to synchronize the operation of the generators 31, 32, 33 and 34, there is provided a timing-impulse generator 36 having a plurality of output circuits coupled to the input circuits of the generators just mentioned.

Connected in cascade to the output circuit of the signal-generating tube in the device 30 in the order named are a signal-developing system 37 being part of the transmitter of the signal-multiplexing system in accordance with the invention and to be described in more detail hereinafter, a 0–4 megacycle low-pass filter network 38, the modulation-frequency amplifier 35, a modulator 39 having an oscillator 40 coupled thereto, and a power amplifier 41, the signal output of the latter being applied to the antenna system 42, 42. The modulator 39, the oscillator 40, the power amplifier 41, and the antenna system 42, 42 comprise means for developing and transmitting a wave signal. The modulator 39 comprises means for modulating the wave signal with a plurality of signals developed in the signal-sampling device 37.

*General operation of transmitter of Fig. 2*

Considering now the general operation of the transmitter of Fig. 2 as thus far described and neglecting for the moment the detailed operation and description of the signal-developing system 37 constructed in accordance with the present invention, the transmitter includes the components of one type of a conventional monochrome-signal television transmitter, all of the components represented schematically being of any well-known suitable construction. Briefly, the image of the scene to be televised is focused upon the target or image screen of the camera in the unit 30 and a cathode-ray beam is developed, accelerated and focused on this screen. Conventional scanning or deflection currents developed by the generators 31, 32 are utilized to deflect the beam to scan successive fields of parallel lines on the target. Blanking pulses developed by the generator 33 are applied to the control electrode of the camera tube to suppress or block out the scanning beam during retrace intervals of the scanning cycles and are applied to the amplifier 35 to suppress or block out undesirable pulses developed in the transmitter-receiver system and to aid in obtaining the required wave form of the video-frequency signal applied to the unit 35. The photosensitive elements of the camera image screen are electronically affected by the varying values of light and shade at corresponding incremental areas of the image focused thereon, as the cathode-ray beam scans the target, and signals representative of the light characteristics, being of corresponding varying amplitude and of very high definition, are developed in the output circuit of the device 30 and applied to the signal-developing device 37. The high-definition signals, representative of the light characteristics of the image, are utilized to develop a plurality of signals in the unit 37, are translated therethrough in a manner more fully to be described hereinafter, and are applied to the amplifier 35 after passing through the filter network 38. These signals are amplified in the amplifier 35, are applied to the modulator 39 to modulate a wave signal generated by the oscillator 40 and are transmitted by means of the power amplifier 41 and the antenna system 42, 42.

*Description of signal-developing system of Fig. 2*

Referring now more particularly to the signal-developing system 37, being in this embodiment a signal-sampling system embodying one form of the present invention, this system is very similar in construction to the system 16 of Fig. 1, similar components being designated by similar reference numerals and analogous components by similar reference numerals primed. Thus the timing-signal generator 24, the phase-shifting network 25, and the multivibrator 26 are all similar to corresponding units in the system 16 of Fig. 1 and may have similar control effects applied thereto. For this purpose, the generator 24 is coupled to the line-frequency generator 31 or the timing-impulse generator 36 as indicated by the broken connection line and the multivibrator 26 is coupled to the field-frequency generator 32. The units 25 and 26 are represented by broken-line blocks for the reason described with reference to Fig. 1.

The signal-sampling system 37 also comprises a signal-multiplexing apparatus, specifically, a sampling device 22' which is similar in construction to the sampling device 22 of the system 16 of Fig. 1 but which is arranged in the system 37 in a manner inverse to that of the device 22 in the system 16 so as to be complementary to the latter device. The proportioning of the timing device comprising the unit 24 or the units 24, 25 and 26 is similar to that described with reference to the system 16 and the frequency of operation of the device 22' is similar to that of the device 22 of system 16.

In the signal-sampling system 37 the timing-signal generator 24 may, if desired, be a crystal-controlled device of proper frequency. If a crystal-controlled generator is utilized, then no control signals need be applied by the units 31 or 32 and, as a practical matter, the signals developed by the units 31 and 32 possibly would be obtained as subharmonics of the signal developed in the crystal-controlled generator 24.

*Explanation of operation of signal-developing system of Fig. 2*

It is the purpose of the signal-developing system 37 to develop a modulation signal of the type that can be utilized in a receiver as represented by Fig. 1 and to develop a plurality of low-definition signals from the high-definition signals applied thereto from the camera device 30 to facilitate the translation of the high-definition signals through a given pass band. The system 37 is a multiplexer and combines 0–4 megacycle signals with a subcarrier modulated by 4–8 megacycle signals. Also, these signals must be combined in the unit 37 in such a manner that modulation signals which are capable of producing patterns of the type represented by Figs. 7 and 8 or similar patterns are developed. Such a result is effected by the sampling device 22'. The operation of the timing device comprising unit 24 or units 24, 25 and 26 is the same as the operation of the timing device comprising similar units in the system 16. The high-definition signal, specifically a 0–8 megacycle signal representing the light characteristic of the image, is applied to the input circuit of the device 22' and this device periodically develops therefrom, under the control of the timing-signal generator 24, a plurality of signals individually related to frequency components of the high-definition applied signal and combines these signals into an integrated 0–4 megacycle signal in such a manner that any interference pattern resulting from the transmission of the plurality of signals through the 0–4 megacycle pass band between the transmitter and the receiver has the centers of the elemental areas thereof displaced along at least one of the scanning lines with reference to the centers of substantially all the elemental areas on at least an adjacent line in space and applies these developed signals to the amplifier 35 through the 0–4 megacycle filter network 38. This signal then modulates the wave signal in the unit 39, the modulated wave signal being radiated from the antenna network 42, 42, after being amplified in the unit 41. In such a manner 0–8 megacycle information is translated through a 0–4 megacycle pass band and all interference patterns are caused to be of a low-visibility type.

*Description of portion of color-television receiver of Fig. 3*

Fig. 3 represents a portion of a color-television receiver including the present invention in one form. Except for a signal-sampling system 60 in accordance with the present invention and to be described more fully hereinafter, a color-television receiver of the type generally to be considered herein is more fully described in the previously refered to RCA Review for December 1949, volume X, No. 4, pages 504–524.

As represented, a filter network 51 has an input circuit coupled to terminals 50, 50, adapted to be connected to the output circuit of a video-frequency amplifier of the type represented by unit 15 of Fig. 1. As represented in Fig. 3, there are two parallel-connected signal-translating channels coupled to the output circuit of the network 51. Filter 51 may not be a physical portion of the receiver but may represent the bandwidth limitations of the circuits through which the signal must pass in reaching this point in the receiver. One of these channels includes in cascade, in the order named, a filter network 52 having frequency characteristics to be more fully described hereinafter and coupled to the unit 51, an amplifier 53, a sampling device **54*a* and three similar 0–2 megacycle low-pass filter networks 55*a*, 55*b* and 55*c* having input circuits respectively connected to individual output circuits of the unit 54*a* and having output circuits individually coupled to image-reproducing devices in an image reproducer 56. The device 54*a* may be of a type more fully described in the RCA Review article referred to above including a single input circuit and a plurality of output circuits equivalent in number to the number of basic colors being utilized to reproduce the color image. The image reproducer 56 may include a single cathode-ray tube having multiple input circuits and capable of reproducing a color image or a plurality of cathode-ray tubes, a combination of which is capable of reproducing a color image. Beam-deflecting signals are applied to the image reproducer 56 through the terminals 57, 57.**

The other signal-translating channel coupled to the output circuit of the network 51 comprises in cascade a sampling device **54*b*, a filter network 58 having frequency characteristics to be described more fully hereinafter, and an isolation amplifier 59 having individual output circuits coupled respectively to the individual input circuits of the image reproducer 56. The sampling device 54*b*, having a single input and a single output circuit may comprise a coincidence mixer type of circuit for selectively translating only predetermined ones of the signals applied thereto. A color-television receiver similar to the type just described, without the sampling device 54*b*,** is also more fully described in the inventor's copending application, Serial No. 164,114, filed May 25, 1950, entitled "Color-Television System."

The filter networks 52 and 58 have interdependent band-pass characteristics as described in the copending application just mentioned for purposes which will be described more fully hereinafter. In general, these frequency characteristics are determined by the type of operation of the receiver, whether it is to be a receiver of the so-called "mixed-high" type in which only a band of high-frequency signals representing the high-frequency brightness components of the image is translated through the network 58 or whether all of the frequencies containing brightness or resolution information are to be translated therethrough. If the network 58 is proportioned to have a 2–8 megacycle pass band and thus be capable of translating only mixed-high signals therethrough, then the network 52 is proportioned to have a 0–4 megacycle pass band. Similarly, if the network 58 has a 0–8 megacycle pass band and thus be capable of translating all of the monochrome signal therethrough, the network 52 has a 2–4 megacycle pass band. In either case, it will be seen that, though the network 51 has a 0–4 megacycle pass band, the network 58 has a pass band, in the embodiment under consideration, which will pass frequencies up to 8 megacycles.

The components included in the block defined by the dash-line construction and designated by the reference numeral 60 comprise the components of a signal-sampling system in accordance with the present invention and will be described more fully hereinafter. Also, it will be understood that the various units of the receiver thus far described, with the exception of the system 60, may be of any conventional construction and design. The details of such units are well known in the art rendering a further description thereof unnecessary.

*Explanation of operation of portion of television receiver represented by Fig. 3*

Considering briefly the operation of the receiver as a whole and assuming for the moment that the unit 60 comprises a means for deriving signals representative of the colors which compose the image, a video-frequency signal which represents the brightness and color characteristics of a color image is applied through the terminals 50, 50 to the network 51, translated therethrough and applied both to the network 52 and the sampling device **54*b*. The signal applied to the network 52 is amplified in the amplifier 53 and the color-signal components are derived therefrom by means of the sampling device 54*a*. These color-signal components are then individually translated through the networks 55*a*, 55*b* and 55*c* and individually applied to suitable input circuits in the image reproducer 56. The signal applied to the sampling device 54*b* is translated therethrough and through the network 58 and the amplifier 59 wherein a plurality of individual similar brightness or monochrome signals are developed for application to the individual input circuits in the image reproducer 56. The signals applied to the image reproducer 56 from both the units 55*a*, 55*b* and 55*c* and the unit 59** combine therein to reproduce the color image.

As used herein and in the appended claims, the term "brightness" relates to the apparent intensity of light in a color image as determined by a viewing means. The viewing means may be one, for instance the human eye, which has a sensitivity that is different for each of the basic colors used to compose the color image or may be one which is equally sensitive to all colors.

*Description of signal-sampling system of Fig. 3*

The signal-sampling system 60 of Fig. 3 is similar to the system 16 of Fig. 1 but includes two complete sampling arrangements. Similar circuit components of the systems are designated by similar reference numerals. In addition, similar components in the two sampling arrangements are designated by similar reference numerals having different letter suffixes.

The sampling device **54*a* is proportioned to sample the signal applied thereto in a cyclic manner to derive therefrom a plurality of signals individually related to the color characteristics of substantially discrete elemental areas displaced along each scanning line of the image specifically to produce separate pulses of the signals individually related to the basic colors utilized in reproducing the color image. These discrete elemental areas, when reproduced in the image, result in an undesired interference pattern. The image is desired but the grain or structure used to compose the image amounts to an interference pattern and should be of low visibility in the reproduced image. The timing-signal generator 24*a*, the phase-shifting network 25*a* and the multivibrator 26*a* are coupled to the device 54*a* in the manner described with respect to similar components with reference to the system 16 of Fig. 1, suitable control circuits being coupled to the terminals 61, 61 and 62, 62 in Fig. 3 similar to those used in the system of Fig. 1. The units 24*a*, 25*a* and 26*a* are proportioned to control the frequency and timing of the device 54*a* with respect to the line-scanning frequency so that the sampling device 54*a* derives only those color signals which will produce in the reproducer 56 on the image screen thereof an interference pattern in which the elemental areas for any one color have the centers thereof displaced along at least one of the scanning lines with reference to the centers of substantially all the elemental areas for the same color on at least an adjacent line in space. In particular, the generator 24*a* is proportioned to develop a signal having a frequency which is effectively an odd multiple of one-half the line frequency and the units 25*a* and 26*a* are proportioned to develop a signal which shifts the phase of the signal developed in the unit 24*a* in every other scanning field by approximately 90°. It will be understood that many signals capable of being developed by the unit 24*a* or many combinations of such signals with control signals capable of being developed by the units 25*a* and 26*a*** will effect the result just described.

The units **24*b*, 25*b* and 26*b* are similar to the corresponding units in the sampling circuit just described but may have different frequency characteristics. If desired, the generators 24*a* and 24*b* may be replaced by a single generator coupled in circuit with each of the sampling devices 54*a* and 54*b*, having parameters so proportioned as to develop a plurality of timing signals of different frequencies each related to the predetermined or line frequency, to control the sampling devices individually to develop signals related to different patterns of dots or elemental areas. Specifically, the timing signals may have harmonically related frequencies. In such a case, if the single timing-signal generator is not controlled by a signal applied directly to it, preferably from a synchronizing-signal separator of the type of the unit 18 of Fig. 1, through the terminals 62, 62**, then only one phase-shifting network and one multivibrator circuit would be coupled to such timing generator to effect the desired control.

The sampling device **54*b* is very similar in structure and purpose to the device 22 of Fig. 1. It is proportioned to operate at a frequency different than that of the device 54*a*, preferably at a frequency harmonically related to the frequency of the device 54*a*, specifically at twice that frequency. Though such harmonic relationship is not necessary, the device 54*b* should at least be proportioned to operate at a higher frequency than the device 54*a*** in view of the higher definition desired in the monochrome portion of the image.

*Explanation of operation of signal-sampling system of Fig. 3*

Before considering the operation of the system of Fig. 3 it will be helpful to consider the problems involved in a double sampling system to reproduce a color image. The advantages of utilizing low-visibility patterns to produce images have been thoroughly considered with respect to the sampling of monochrome signals. It will be understood that similar advantages are attainable when both the patterns developed in a double sampling system are of low-visibility types. In addition, it is equally important that any resultant pattern formed from a combination of the two patterns be of a low-visibility type. Thus in a sampling arrangement such as in Fig. 3 where the color sampling frequency is 3.8 megacycles and the monochrome sampling frequency is 7.6 megacycles, there may be a tendency to develop another interference pattern resulting from the heterodyning of the color subcarrier signal and the monochrome sampling signal. This pattern should also be of a low-visibility type and it is readily seen that the monochrome and color patterns should be of different forms to effect such a resultant pattern, one that is not of a vertical dot arrangement having high-visibility characteristics.

Before considering the operation of the Fig. 3 sampling system, it will be helpful to discuss some prior art arrangements. In prior art arrangements as explained in the RCA Review article previously referred to, the device **54*a* is operated in such a manner as to select the separate pulses related to the basic color signals to form for any one color a pattern on the image screen of the reproducer 56 of the type represented by the pattern of Fig. 6. During one field of scan in the reproducer 56**, all of the dots designated as (1) are placed on the screen. In succeeding fields of scan, the dots designated by the numerals which correspond to the field of scan then being used are placed on the screen so as to form for one color the pattern represented by Fig. 6 in four fields of scan. As described in the article just mentioned, in a symmetrical three-phase type of sampling arrangement, where the signals related to the three basic colors utilized to produce the color image are sampled at 120° intervals, similar patterns for the three colors are formed, each pattern being displaced from the others by a horizontal distance related to the spacing between the sampling intervals of the three colors. Other types of sampling of the signals related to the basic colors will produce similar pattern relationships.

Since a plurality of signals individually related to the different colors in the image are sampled in each sampling cycle, the sampling rate for each color signal is normally lower than that utilized when only one signal is being sampled per cycle. Thus, where the monochrome signals previously considered were sampled at a rate of 7.6 megacycles per second, in the case of three color signals, the rate would normally be one-third of 7.6 megacycles. By utilizing a system of mixed-high signals as described in the RCA Review article previously mentioned, a sampling rate as high as approximately 3.8 megacycles per second may be attained for each color signal. As a result of this lower sampling rate, the patterns of Figs. 6, 9 and 10 considered hereinafter with relation to the reproduction of color images may be considered to have one-half as many dots as when previously considered, the spacing between dots being increased by a factor of two.

Now with reference to the operation of the system of Fig. 3 as previously stated, a pattern such as that of Fig. 6 has a tendency to produce crawling and interdot flicker effects due to the arrangement of the dots and the low-frame frequency utilized. In the system of Fig. 3, to diminish the crawling effects that may occur in the dots representing the basic colors, the generator **24*a* operates to control the sampler 54*a* at a sampling frequency of 3.8 megacycles so that a pattern of the type represented by Fig. 9 is developed on the image screen of the reproducer 56**. It is readily seen that in such a pattern, any predominant tendency to crawl in any one direction, such as vertically upward as in the pattern of Fig. 6, is replaced by a number of similar tendencies to crawl in opposing directions. As an example, in the pattern of Fig. 9 there is produced a tendency to crawl in small circles, adjacent circles crawling in opposite directions thereby effecting some degree of cancellation even of the circular crawling effects. There is no predominant tendency for vertical or horizontal crawl and the eye is less affected by the similar but opposing crawling effects that may occur than it would be if such effects had predominant tendencies. In addition, the pattern of Fig. 9 effectively provides improved horizontal resolution due to the staggering of the dots, thereby effectively forming more vertical lines.

Though the operation of the device **54*a* in the manner just discussed improves the horizontal resolution of the color dots and effectively diminishes predominant crawling effects that previously occurred therein, there is still the problem of improving the over-all definition of the image. This is solved by sampling the monochrome signal in the manner previously considered without introducing the effects of undesired beat signals between the color and monochrome signals and without increasing the spurious signal effects produced in the reproduced image by permitting the color subcarrier signal to be translated through the monochrome channel. To solve this problem, the device 54*b* is operated in the manner previously considered with respect to the device 22** of Fig. 1 to improve the resolution of the monochrome signal, thereby further improving the over-all resolution of the reproduced color image, while providing a pattern which, when combined with the pattern of the color, will effectively not introduce high-visibility beats between the color and monochrome signals and will retain a low-visibility appearance of the color subcarrier signal in the monochrome portion of the image.

The device **54*a* develops a pattern of the type represented by Fig. 9 with a sampling frequency of 3.8 megacycles. Such a pattern is obtainable by shifting the phase of the 3.8 megacycle sampling signal by 90° in every other field of scan. A checkerboard pattern of the monochrome signal, which is in proper phase relationship with the pattern of the color signal, is obtained by sampling the monochrome signal by means of the device 54*b*** at twice the color-signal sampling frequency and effectively producing a 180° phase shift of the signal in every other field. By sampling at such a frequency, a complete monochrome image may be produced in one-half the time required to complete the color sampling pattern and therefore a frame frequency of thirty cycles per second may be used for the monochrome signals. The timing relationship of the two sampling frequencies may be related to the time of sampling of any one of the basic color signals, for instance, the sampling of the green color signals, so that when this color is being sampled the two sampling signals are in phase.

The checkerboard pattern of signals produced by the sampling device **54*b*** as represented by Fig. 7, with a sampling frequency of 7.6 megacycles, is seen to be the same pattern as that represented by Fig. 9, with a sampling frequency of 3.8 megacycles with the dots designated as (3) and (4) therein being, respectively, changed to dots designated as (1) and (2). Thus it is also seen that the pattern of Fig. 7 may be developed by using the second harmonic of the sampling frequency used to develop the pattern of Fig. 9. Only two fields are utilized to make one monochrome frame, two monochrome frames occurring during one color frame of four fields. Thus it is seen that the combination of a color-signal sampling device which operates to reproduce the color signals in a pattern of the type of Fig. 9 at a sampling frequency of 3.8 megacycles together with a checkerboard or other stagger type of monochrome-signal reproduction of the type of Fig. 7, with a sampling frequency of 7.6 megacycles, produces a color image which effectively has much greater definition and which is composed of low-visibility interference patterns arranged to develop only low-visibility beat effects between the patterns.

It is to be understood that the types of patterns just described can be combined in many different ways to effect the desired result. Thus the monochrome components of the picture can be reproduced by the type of pattern described with reference to the color components and the color components be reproduced by the pattern previously described with reference to the monochrome components if the proper sampling frequencies are selected. Other combinations of patterns to effect the desired result can also be used, for example, a staggered dot pattern may be used for either the color or monochrome portions of the image but such a staggered dot pattern need not be used for both color and monochrome portions at the same time. Though the use of only one such pattern in this manner is not as advantageous as using related staggered dot patterns for both monochrome and color, it is readily seen that some of the advantages of the invention will be thereby obtained.

There is an additional type of pattern that might be utilized in place of the type of pattern represented by Fig. 9 by proper proportioning of the sampling circuits. This pattern is represented by Fig. 10 and is developed by a time interlace arrangement of the type of pattern represented by Fig. 8. The Fig. 10 pattern is produced by effectively advancing the phase of the sampling signal by 180° after every other field or by shifting the sampling frequency by an odd multiple of one-quarter field frequency. The advantages of a pattern of the Fig. 10 type over one of the Fig. 9 are similar to those of the pattern of Fig. 8 over the pattern of Fig. 7 as previously considered.

If the pattern of Fig. 10 is obtained by utilizing the units 25*a* and 26*a* effectively to effect a shift of 180° in the phase of the 3.8 megacycle sampling frequency after every other field of scan, then the second harmonic of such a signal, having a frequency of 7.6 megacycles, develops a pattern of the type represented by Fig. 8. Since the sampling frequencies of the two patterns are different, if the pattern of Fig. 8 is considered to be to the proper scale, then the pattern of Fig. 10 has one-half as many dots as are represented. The second harmonic signal may be utilized to control the sampling device 54*b* to sample the monochrome signal to obtain a pattern of the type of Fig. 8 and the Fig. 8 and Fig. 10 patterns combined to reproduce the color image. A similar relationship exists between the patterns of Figs. 7 and 9. These relationships are useful in that each of the patterns is of the low-visibility type, one pattern being obtainable from the second harmonic of the signal which develops the other and, since the patterns have such relationship, any resultant pattern developed by heterodyning the two sampling signals will be similar to the lower frequency pattern and thus also have low-visibility characteristics.

*Description of color-television transmitter of Fig. 4*

Referring now more particularly to Fig. 4 of the drawings, there is represented an apparatus, specifically a portion of a color-television transmitter for producing and transmitting the types of video-frequency signals which are utilized in the receiver of Fig. 3 and particularly in signal-sampling systems of the types described with reference to Fig. 3. The portion of the transmitter represented by Fig. 4 is arranged to be coupled to components of the type previously described with reference to the transmitter represented by Fig. 2. Thus units such as the blanking-pulse generator 33, the line-frequency generator 31, and the field-frequency generator 32 of Fig. 2 would be coupled respectively to the terminals 70, 71, and 72 of the camera device 73 of Fig. 4. Similarly, the terminals 74, 74 in the output circuit of a signal-combining circuit 75 are arranged to be coupled to the input circiut of the modulation-frequency amplifier 35 of Fig. 2.

The camera device 73 may be of conventional design including one or more cathode-ray signal-generating tubes but for the purpose of simplicity in description it will be assumed that it includes three cathode-ray tubes each individually responsive to different colors, in particular to the colors green, red and blue. The cathode-ray tubes may have the usual electron-gun structure and photosensitive targets or image screens and line-scanning and field-scanning means. Individual output circuits of the device 73, one for each of the basic colors utilized to translate the color information of an image, are coupled, respectively, to filter networks 76*a*, 76*b* and 76*c* and are also coupled, respectively, to individual input circuits of a signal-combining circuit 77. The individual output circuits of the units 76*a*, 76*b* and 76*c* are then coupled, respectively, to individual input circuits of a sampling device 54*a'*, the output circuit of which is coupled in cascade with filter network 52' and an input circuit of the signal-combining circuit 75. The signal-combining circuit 77 is coupled in cascade in the order named with a filter network 58', the sampling device 54*b'*, a low-pass filter network 78 and another input circuit of the signal-combining circuit 75. The units enclosed within the dashed-line block 79 comprise a signal-developing system, in particular, a signal-sampling system in accordance with the present invention and will be considered in more detail hereinafter.

*General operation of transmitter of Fig. 4*

Consider now the general operation of the transmitter of Fig. 4 as thus far described, neglecting for the moment the detailed operation and description of the signal-sampling system 79 constructed in accordance with the present invention, all the components illustrated schematically may be of any well-known suitable construction and the system 79 may be considered to be a color-signal sampling system of the type discussed in the article in "Electronics" previously referred to. Briefly, an image of the scene to be televised is focused on the image screens of the individual cameras in the device 73 and the cathode-ray beams of the several camera tubes are developed, accelerated and individually focused on the separate screens. Color filter systems present in the unit 73 for each camera tube determine the distinctive basic colors separately focused on the individual image screens. Conventional scanning or deflection currents deflect these beams individually to scan the different images in a manner similar to that described with reference to the transmitter of Fig. 2.

The color signals thereby developed are individually translated along the conductors designated G, R and B, respectively. These signals are separately translated through the units 76*a*, 76*b*, 76*c*, cyclically sampled by the device 54*a'*, in a manner to be described more fully hereinafter, to form a composite color wave signal, translated through the filter network 52' and applied to the signal-combining circuit 75. These color signals are also combined in the signal-combining circuit 77 to form a brightness or monochrome signal which is then translated through the network 58', through the sampling device 54b', in a manner to be described more fully hereinafter, through the network 78 and applied to the unit 75. The signals applied to the signal-combining circuit 75 are combined therein to form a composite video-frequency signal which is then applied through the terminals 74, 74 to a modulation-frequency amplifier, such as the unit 35 in Fig. 2. Components such as the units 39, 40 and 41 of Fig. 2 are then effective in radiating the composite video-frequency signal or modulation signal of a carrier wave signal.

*Description of signal-sampling system of Fig. 4*

The signal-sampling system 79 of Fig. 4 is very similar in construction to the system 60 of Fig. 3, similar components being designated by similar reference numerals and analogous components by similar reference numerals primed. The coupling of these units to form the two signal-sampling arrangements is the same as that in the system 60 of Fig. 3. The generators 24a and 24b have input circuits coupled to a terminal 80 which is arranged to couple these units to a source of frequency-control signals such as a line-frequency generator 31 or timing-impulse generator 36 of Fig. 2. The conductor coupling these units to the terminals 80, 80 is represented in broken-line construction to indicate that the units 24a and 24b may be highly stable crystal-controlled types requiring no external control signals. The units 25a, 26a and 25b, 26b are connected to a source of suitable low-frequency signals through the terminal 81, specifically to a field-frequency generator such as the generator 32 of Fig. 2.

The sampling devices 54a' and 54b' are similar in construction to the sampling devices represented in Fig. 3 but are arranged in the system 79 in a manner inverse to that of the arrangement of the devices 54a and 54b in Fig. 3. The proportioning of the device 54a' and also of the units 25a, 26a and 25b, 26b is similar to that described with reference to similar units in the system 60 of Fig. 3. In order for the transmitter of Fig. 4 and the receiver of Fig. 3 to operate in the same system, the modes of operation of the devices 54a and 54a' and of the devices 54b and 54b' are usually the same.

*Explanation of operation of signal-sampling system of Fig. 4*

It is the purpose of the signal-sampling system 79 to develop a modulation signal of the type that can be utilized in a receiver such as is represented by Fig. 3. Therefore, color and monochrome signals which are capable of producing patterns of the types considered with reference to the receiver of Fig. 3 are developed by the sampling devices 54a' and 54b', respectively. In order to develop these signals, individual color signals are applied to the input circuit of the device 54a' and individual ones thereof are periodically sampled by the unit 54a' to develop a color wave signal having the color signals in proper phase relationship as modulation components thereof. When the color wave signal is sampled at the receiver, the synchronization of the sampling devices at the transmitter and the receiver, together with the phase relationship of the color signals, combine to effect a production of the patterns described with reference to the receiver. Similarly, the sampling device 54b' samples the monochrome signal applied thereto to produce a signal which when sampled by the device 54b at the receiver will result in the development of the monochrome patterns considered with reference to the receiver.

*Other advantages of utilizing double sampling at the transmitter*

In addition to the advantages previously considered, with respect to sampling of both the monochrome and color signals, there are other advantages which may be obtained by operating the sampling devices 54a' and 54b' of Fig. 4 in a related manner. As more thoroughly discussed in the inventor's copending application, Serial No. 159,212, filed May 1, 1950, entitled Color-Television System, cross talk between the high-frequency components of the monochrome signal and the color signal occurs in the output circuit of the color-signal sampling device in the receiver due to the heterodyning action between these high-frequency components and the sampling frequency. As a result, low-frequency spurious signals normally appear in the reproduced image. As also explained in the application just referred to, these spurious effects may be greatly diminished by causing the effects in each of the colors being used to have equal optical effects on the human eye thereby being effectively canceled in the eye. By operating the sampling device 54b' at a frequency which is the second harmonic of the frequency at which the devices 54a' of Fig. 4 and 54a of Fig. 3 are operated and in proper phase relationship, further cancellation of these effects may be obtained.

A high-frequency component in the monochrome signal at, for example, a frequency of 3.6 megacycles will produce in the output circuit of the sampling device at the transmitter, when it is operated at approximately 7.6 megacycles, components at 3.6 and 4.0 megacycles in accordance with the theory of operation of double sampling as previously discussed. These components will thus appear in the input circuit of the color-signal sampling device at the receiver. Thus, if the device 54a of Fig. 3 is operated at a rate of 3.8 megacycles (one-half the rate of the monochrome-signal sampling device at the transmitter), the 3.6 and 4.0 megacycle components will appear as 0.2 megacycle undesired components in the output thereof being the result of the 4.0 megacycle minus the 3.8 megacycle signals and the 3.8 megacycle minus the 3.6 megacycle signals. By sampling a predominant color such as green at both the transmitter and receiver in phase-quadrature relationship with the phase of the monochrome sampling, the 0.2 megacycle undesired components electrically cancel. The 0.2 megacycle components resulting from the 4.0 and 3.6 megacycle signals then do not completely cancel in the other colors. In view of this cancellation in one color and lack of cancellation in the other colors, as a practical matter, the phase relationship between the color-sampling device and the monochrome-sampling device is adjusted so that the maximum cancellation occurs insofar as the eye is able to detect. This means that some cancellation will probably occur in all colors but complete cancellation will not occur in any one color. If a system such as that described in the application Serial No. 159,212 is utilized wherein the sampling of the red color signal is substantially at 180° with respect to the green signal, then by a quadrature phasing the undesired components will cancel in both the green and red colors. The undesired components will then tend to add in the remaining color, namely blue, but since the eye is least sensitive to blue, the over-all effect of these spurious signals is greatly reduced.

*Description of signal-translating apparatus of Fig. 5*

Fig. 5 represents a signal-translating apparatus which may be utilized to translate television signals from a remote television pickup station to a television transmitter over a transmission line having given band-pass characteristics. The components which comprise the apparatus are analogous to those previously considered with reference to Figs. 1 and 2 and, therefore, are designated by similar reference numerals double primed. In addition, units which are similar to each other within the apparatus itself are designated by similar reference numerals having different letter suffixes. The sampling device 22a" is coupled through a filter network 90 to a transmission line 91, the other end of which is coupled to a sampling device 22b''. Input terminals 92, 92 are coupled to the device 22a'' to provide a means for applying thereto the signal to be translated through the transmission line 91 and may be coupled to the ouput circuit of the amplifier 35 of Fig. 2. Terminals 93, 93 are provided to couple the generator 24a'' to a source of control signals, specifically to a generator such as the units 31 or 36 of Fig. 2 or possibly other sources of similar control signals. The terminals 94, 94 are coupling means for coupling the unit 24b'' to a source of control signals similar to those just mentioned and which may be translated directly over the transmission line or be derived from signals translated therethrough. The output terminals 95, 95 of the device 22b'' are to be coupled to a means for radiating the signal, specifically to an antenna through such devices as the modulator 39 and the amplifier 41 of Fig. 2.

*Explanation of operation of signal-translating apparatus of Fig. 5*

Television signals to be radiated from a transmitter are applied to the terminals 92, 92 from such a source as the modulation-frequency amplifier 35 of Fig. 2. The sampling device 22a'' is controlled to operate at a sampling frequency which is approximately twice the upper frequency limits of the transmission line 91 and to sample the signals applied thereto in a manner which will relate the sampled signals to one another as the signals in the patterns represented by Figs. 7–10, inclusive, as previously discussed, are related. The signals are then translated through the band-limiting filter network 90, the transmission line 91 and are desampled by the device 22b'' to develop signals of the type originally applied to the terminals 92, 92.

By utilizing a sampling frequency of twice the upper frequency limit of the coaxial line, the effective pass band of the transmission line 91 is increased in accordance with the theory previously described. If the sampling frequency is not controlled as described above to effect an interference pattern of staggered pulses along adjacent scanning lines in space, the spurious effects produced by such sampling offset the advantages gained so that, effectively, the usable bandwidth of the translated signals would not be appreciably increased. The application of the theory of the present invention to the sampling arrangement effectively eliminates these spurious effects, as previously described herein, by effectively sampling, so that, in the image which will ultimately be reproduced, the sampling effects will react on one another in such manner as to be made effectively invisible to the human eye, thereby making practical such translation of wide band information through narrow band channels.

An arrangement of the type represented by Fig. 5 can be utilized to translate video-frequency signals including dot interlaced color signals. The theory of the invention as described herein requires that the pattern which is characteristic of the video-frequency signals translated over the coaxial line be different from the pattern which is characteristic of the color signals translated from the transmitter to the receiver. For the utmost advantage, as previously discussed herein, each of the patterns used should be of a low-visibility type and the beat note between these patterns should result in a low-visibility pattern.

There is another interesting aspect to the use of an arrangement such as that of Fig. 5 between a transmitter and a receiver. In the case where there is sampling of the color signals at the transmitter, as in the color transmitter represented by Fig. 4 and previously described herein, the addition of an arrangement such as Fig. 5 produces cascaded sampling. The color-signal sampling device at the transmitter, such as the unit 54a' of Fig. 4, is in cascade with the sampling device 22a'' of Fig. 5. It is therefore seen that, if single side-band color transmission is normally utilized for color-signal components having frequencies above 0.4 megacycle, as in a system where the sampling frequency is approximately 3.6 megacycles and a 0–4 megacycle pass band is being utilized, double side-band transmission for the signals having frequencies above 0.4 megacycle may be obtained by operating the sampling device 22a'' at the second harmonic of the color-signal sampling device 54a' in the transmitter and folding back the upper side band in the manner previously discussed herein.

*Description of signal-detection system of Fig. 11*

There have previously been described herein various embodiments of the invention particularly with reference to sampling types of arrangements wherein a time multiplexing of the intelligence signals is utilized. In the systems including such embodiments the intelligence signals are translated through the same pass band in two or more groups of independent signals. The subcarrier wave signals utilized are of a common frequency differing from each other only in phase. A time-sequential modulator and a time-sequential detector, designated hereinbefore as sampling devices, are utilized respectively to effect modulation of these subcarriers at the transmitter and to derive the modulation signals therefrom at the receiver. As considered in the initial paragraphs hereof, similar results and similar deficiencies occur when utilizing a band-sharing type of multiplexing in which the subcarrier wave signals differ in frequency within the pass band. Though the interference pattern problems occur when such subcarrier wave signals are used either to translate higher resolution information or color information, such problems will be considered hereinafter, for purposes of simplicity of explanation and brevity, only with relation to a color-television system.

A color-television system of the band-sharing type may, for example, be arranged to utilize a 0–4 megacycle signal to translate resolution information and one of the three basic colors, a modulated subcarrier wave signal of approximately 3.47 megacycles to translate another color and a second subcarrier wave signal of 3.75 megacycles to translate the third color. It is seen that all of these signals must pass through the 0–4 megacycle pass band, that the 3.47 and 3.75 megacycle subcarrier wave signals will be undesired signals in the reproduced image and that the beating of these signals and their side-band signals with each other and with the 0–4 megacycle signals will produce undesired interference patterns in the reproduced image.

Fig. 11 represents a signal-detection system for a receiver of the type just described. A transmitter for such a system is not described herein since means for deveolping such subcarrier wave signals, for effecting modulation thereof and for combining the subcarrier wave signals and the 0–4 megacycle signal for translation through the 0–4 megacycle pass band, are well known.

The signal-detection system of Fig. 11 includes a pair of terminals 101, 101 adapted to have the output signals of a video-frequency amplifier, for instance a unit such as unit 15 of Fig. 1, applied thereto. There is connected in cascade between the ungrounded one of the terminals 101, 101 and an output terminal B a 3.75–4.0 megacycle band-pass filter network 103a, a signal detector 104a and a 0–.25 megacycle low-pass filter network 105a. Connected in cascade between the ungrounded one of the terminals 101, 101 and an output terminal R are a 2.5–3.6 megacycle band-pass filter network 103b, a signal detector 104b and a 0–1.0 megacycle low-pass filter network 105b. The ungrounded one of the terminals 101, 101 is also directly connected to an output terminal G. The grounded terminal of the terminals 101, 101 is connected to an output grounded terminal 106 through ground. A 1–4 megacycle band-pass filter network 107 effectively is connected between the terminals G and R. The terminals B, R and G are adapted to be connected to the control electrodes of cathode-ray tubes responsive, respectively, to the signals representing the colors blue, red and green. The terminal 106 is adapted to be connected to the cathodes of these tubes.

The signal-detection system of Fig. 11 also includes a timing-signal generator 108 connected to a pair of terminals 102, 102. Terminals 102, 102 are adapted to have applied thereto a control signal for the unit 108 which may be derived from a synchronizing-signal separator, for instance, one such as is shown as unit 18 of Fig. 1. The timing-signal generator 108 is coupled to the detectors 104*a* and 104*b* to control the operation of these detectors in a manner to be described more fully hereinafter. The generator 108 is shown in broken-line construction to indicate, as will be explained more fully hereinafter, that such a unit may not be a necessary part of the signal-detection system of Fig. 11.

*Explanation of operation of signal-detection system of Fig. 11*

As in the signal-detection system of Fig. 3, as previously considered, a video-frequency signal which represents both the brightness and color characteristics of a color image is applied through the terminals 101, 101 to both of the units 103*a* and 103*b* and is also applied directly to the output terminal G. Such a signal has 0–4 megacycle frequency components. It may be assumed that the signal which includes the resolution of the image may also include the green color information of the image and, therefore, that the signal applied to the terminals 101, 101 may directly be applied to the output terminal G. The information relating to the blue and red colors in the image is also translated through the 0–4 megacycle pass band and, therefore, applied to the terminals 101, 101 as modulation signals of a 3.8 megacycle and a 3.47 megacycle subcarrier wave signal, respectively. At the transmitter the 3.47 megacycle subcarrier wave signal is modulated so as to have side bands between 2.5 megacycles and 3.6 megacycles. Similarly, the 3.8 megacycle subcarrier wave signal is modulated at the transmitter to have side bands between 3.75 and 4.0 megacycles. The 3.8 megacycle subcarrier wave signal with its side bands is translated through the band-pass filter network 103*a* and the modulation signals thereof are derived in the detector 104*a* and translated through the low-pass filter network 105*a* to the terminal B. The 3.47 megacycle subcarrier wave signal with its side bands is translated through the filter network 103*b*, the modulation signals thereof are derived in the detector 104*b* and are translated through the low-pass filter network 105*b* to the terminal R. As previously stated, the 0–4 megacycle resolution and green color signals are applied to the output terminal G. In order to effect better presentation of the resolution information in the reproduced image, resolution signals between the frequencies of 1–4 megacycles, inclusive, are effectively applied to the terminal R from the terminal G through the band-pass filter network 107. The signals on the terminals B, R and G are applied to the respective control electrodes of the color cathode-ray tubes which respond to the signals representative of the blue, red and green coloring of the image.

If the 3.47 and 3.8 megacycle subcarrier wave signals are of the translated type and are not suppressed at the transmitter, the signal-detection system will operate in the manner just explained. If these subcarrier wave signals are suppressed at the transmitter and are not received at the input terminals 101, 101, then some means must be included in the signal-detection system to replace these subcarrier wave signals in proper frequency and phase relationships with the related subcarriers suppressed in the transmitter. The timing-signal generator 108, controlled in a manner previously described with reference to other timing-signal generators, may be included in such case to effect such a result. The output signals of the generator 108 would then inject into the detectors 104*a* and 104*b*, respectively, subcarrier wave signals having frequencies of 3.8 and 3.47 megacycles and which are in synchronism with the related subcarrier wave signals at the transmitter.

Since the signal-detection system just described is similar in many respects with the signal-detection systems previously described and since multiplexing of signals must be utilized to translate the information from the transmitter to the receiver when such a detection system is being utilized, the problems of interference patterns, previously considered, also occur with relation to the system of Fig. 11. These interference patterns represent the presence in the reproduced image of the 3.8 and 3.47 megacycle subcarrier wave signals and of other spurious signals resulting from the beating between these subcarrier wave signals and their side bands and other 0–4 megacycle signals. To minimize the visibility of these interference patterns, the frequencies of the subcarrier wave signals must be controlled with relation to each other and with relation to the line-scanning frequency in such a manner as to effect low-visibility interference patterns of the types previously described. The means for effecting such control to produce such frequency relationships and the types of frequency relationships that should be effected have previously been thoroughly considered and will not be further discussed at this point. The subcarrier wave-signal frequencies 3.47 and 3.8 megacycles comply with the teachings of the invention when one of these frequencies is shifted by a phase of +90° and the other by a phase of −90° on related alternate fields thus developing patterns similar to that represented by Fig. 9. The frequency 3.47 megacycles is equivalent to multiplying the line frequency of 15,750 cycles by the constant 441/2 while the frequency of 3.8 megacycles is equivalent to multiplying the line frequency by a constant of 483/2. The +90° phase shifting causes these frequencies to have opposing relationships at any one time. As a result, the pattern resulting from the presence of the 3.47 megacycle signal in the 0–4 megacycle pass band is of a low-visibility type (Fig. 9 with +90° phase shift), the pattern caused by the 3.8 megacycle signal is of a low-visibility type (Fig. 9 with a −90° phase shift) and the combination of these patterns is of a low-visibility type, such as is represented by Fig. 7.

Though the invention has been described with reference to specific types of television systems, it should be understood that the teachings of the invention may be applied to many different types of television systems. Any television system that utilizes multiplex signal-translation methods causes the undesired interference patterns discussed herein to occur and the teachings of the invention may be applied to such system to diminish the visibility of such pattern in the reproduced image.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A television receiver comprising: a source of a composite signal developed at a transmitter from components of at least one signal which represents a light characteristic of an image scanned at predetermined line and field frequencies in an odd-line interlaced sequence of lines; a signal-generating apparatus for generating a signal having a frequency which differs from approximately a harmonic of said predetermined line frequency by one-third said predetermined line frequency; a timing device coupled to said apparatus for causing said generated signal to vary in phase by 180° on alternate fields; a multiplex-signal detection device coupled to said signal-generating apparatus and said source and responsive to said composite signal for utilizing said generated signal to derive a plurality of signals representative of different light characteristics of said image; and an image-reproducing device having an image screen and scanning means for tracing a sequence of lines synchronous with said first-mentioned sequence of lines on said image screen and coupled to said detection device for utilizing said derived plurality of signals to develop a pattern representative of said image on said screen and which undesirably tends to include an interference pattern of dots, whereby said phase variation of said generated signal causes said dots to be aligned principally along diagonal lines in said image pattern thereby minimizing the visibility of said interference pattern in said image.

2. A television receiver comprising: a source of a composite signal developed at a transmitter from components of at least one signal which represents a light characteristic of an image scanned at line and field frequencies in an odd-line interlaced sequence of lines; a signal-generating means for generating a signal having an average frequency which differs from an integral multiple of said line frequency by an odd integral multiple of one-half said field frequency; a multiplex-signal detection device coupled to said signal-generating means and said source and responsive to said composite signal for utilizing said generated signal to derive a plurality of signals representative of different light characteristics of said image; and an image-reproducing device having an image screen and scanning means for tracing a sequence of lines synchronous with said first-mentioned sequence of lines on said image screen and coupled to said detection device for utilizing said derived plurality of signals to develop a pattern representative of said image on said screen and which undesirably tends to include an interference pattern of dots, whereby said phase variation of said generated signal causes said dots to be aligned principally along diagonal lines in said image pattern thereby minimizing the visibility of said interference pattern in said image.

3. A color-television receiver comprising: a source of a composite signal developed at a transmitter from components of signals representative of the color and brightness characteristics of an image scanned at a predetermined frequency in a sequence of lines; a plurality of signal-generating apparatus for individually generating signals each having a frequency of approximately a harmonic of one-half said predetermined line frequency; a plurality of timing devices individually coupled to different ones of said apparatus for causing each of said generated signals to vary in phase in a predetermined regular manner with respect to said lines and to vary in phase with respect to each other; a plurality of multiplex-signal detection devices individually coupled to different ones of said signal-generating apparatus and said source and each responsive to said composite signal for utilizing different ones of said generated signals to derive a plurality of signals representative of the color and brightness characteristics of said image; and an image-reproducing device having an image screen and scanning means for tracing a sequence of lines synchronous with said first-mentioned sequence of lines on said image screen and coupled to said detection device for utilizing said derived plurality of signals to develop a pattern representative of said image on said screen and which undesirably tends to include an interference pattern of dots, whereby said phase variation of said generated signal causes said dots to be aligned principally along diagonal lines in said image pattern thereby minimizing the visibility of said interference pattern in said image.

4. A television receiver comprising: a source of a composite signal developed at a transmitter from components of at least one signal which represents a light characteristic of an image scanned at line and field frequencies in an odd-line interlaced sequence of lines; a signal-generating means for generating a signal having an average frequency which differs from an integral multiple of said line frequency by one-third said line frequency; a multiplex-signal detection device coupled to said signal-generating means and said source and responsive to said composite signal for utilizing said generated signal to derive a plurality of signals representative of different light characteristics of said image; and an image-reproducing device having an image screen and scanning means for tracing a sequence of lines synchronous with said first-mentioned sequence of lines on said image screen and coupled to said detection device for utilizing said derived plurality of signals to develop a pattern representative of said image on said screen and which undesirably tends to include an interference pattern of dots, whereby said phase variation of said generated signal causes said dots to be aligned principally along diagonal lines in said image pattern thereby minimizing the visibility of said interference pattern in said image.

5. A television receiver comprising: a source of a composite signal developed at a transmitter from components of at least one signal which represents a light characteristic of an image scanned at line and field frequencies in an odd-line interlaced sequence of lines; a signal-generating means for generating a signal having an average frequency which differs from approximately a harmonic of said predetermined line frequency by one-third said predetermined line frequency plus or minus an odd integral multiple of one-quarter said field frequency; a multiplex-signal detection device coupled to said signal-generating means and said source and responsive to said composite signal for utilizing said generated signal to derive a plurality of signals representative of different light characteristics of said image; and an image-reproducing device having an image screen and scanning means for tracing a sequence of lines synchronous with said first-mentioned sequence of lines on said image screen and coupled to said detection device for utilizing said derived plurality of signals to develop a pattern representative of said image on said screen and which undesirably tends to include an interference pattern of dots, whereby said phase variation of said generated signal causes said dots to be aligned principally along diagonal lines in said image pattern thereby minimizing the visibility of said interference pattern in said image.

References Cited in the file of this patent

UNITED STATES PATENTS

| | | |
|---|---|---|
| 2,678,348 | Ballard | May 11, 1954 |
| 2,739,181 | Sleeper | Mar. 10, 1956 |

OTHER REFERENCES

Television vol. VI, "A Six-Megacycle Compatible High Definition Color Television System," pages 270–290, published by RCA Review.

Television vol. VI, "Analysis of Sampling Principles," pages 291–337, published by RCA Review.